(12) United States Patent
Gu et al.

(10) Patent No.: US 7,334,928 B2
(45) Date of Patent: Feb. 26, 2008

(54) FLAT LIGHT-EMITTING LAMP, FABRICATING METHOD THEREOF, AND LIQUID CRYSTAL DISPLAY USING THE SAME

(75) Inventors: Seung Man Gu, Kumi-shi (KR); Kang Ju Lee, Gyeongsan-Shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 280 days.

(21) Appl. No.: 11/120,955

(22) Filed: May 4, 2005

(65) Prior Publication Data
US 2006/0146561 A1    Jul. 6, 2006

(30) Foreign Application Priority Data
Dec. 30, 2004    (KR)    .................... 10-2004-0116989

(51) Int. Cl.
G01D 11/28    (2006.01)
(52) U.S. Cl. .................. 362/560; 362/97; 362/225; 362/249; 362/260; 362/561; 362/614
(58) Field of Classification Search .................. 362/97, 362/225, 249, 260, 560, 561, 614
See application file for complete search history.

(56) References Cited

U.S. PATENT DOCUMENTS

2002/0021564 A1* 2/2002 Cho et al. .................. 362/97

2002/0041268 A1    4/2002 Yajima et al.
2003/0231512 A1    12/2003 Bang et al.
2005/0030277 A1    2/2005 Yoo et al.

FOREIGN PATENT DOCUMENTS

| JP | 2002/132193 | 5/2002 |
| WO | WO 2004/054322 A2 | 6/2004 |
| WO | WO 2004/054322 A3 | 6/2004 |

\* cited by examiner

Primary Examiner—Stephen F. Husar
Assistant Examiner—Meghan K. Dunwiddie
(74) Attorney, Agent, or Firm—McKenna, Long & Aldridge LLP

(57) ABSTRACT

A flat light-emitting lamp includes a first common discharge unit for producing a first electrical discharge according to a first AC waveform having a first phase, a second common discharge unit for producing a second electrical discharge according to a second AC waveform having a second phase different from the first phase, and a plurality of discharge tubes each having first ends connected to the first common discharge unit and second ends connected to the second common discharge unit. The discharge tubes emit light according to the electrical discharges of the first and second common discharge units.

58 Claims, 18 Drawing Sheets

FLAT LIGHT-EMITTING LAMP, FABRICATING METHOD THEREOF, AND LIQUID CRYSTAL DISPLAY USING THE SAME

This application claims the benefit of Korean Patent Application No. P2004-116989, filed on Dec. 30, 2004, which is hereby incorporated by reference for all purposes as if fully set forth herein.

BACKGROUND OF THE INVENTION

1. Field of the Invention

The principles of the present invention generally relate to flat light-emitting lamps, methods of fabricating flat light-emitting lamps, and liquid crystal displays using such flat light-emitting lamps. More particularly, the principles of the present invention relate to a high efficiency, flat light-emitting lamp having a reduced thickness, methods of fabricating such a flat light-emitting lamp, and liquid crystal displays using such a flat light-emitting lamp.

2. Discussion of the Related Art

Various types of flat panel displays such as liquid crystal displays (LCDs), field emission displays (FEDs), plasma display panels (PDPs), light emitting diode (LED) displays, and the like, have been developed as alternatives to cathode ray tubes (CRTs), which are heavy and occupy large amounts of space. LCDs, in particular, are widely incorporated within devices for use as monitors of notebook computers, spacecraft, airplanes, etc.

Transmissive LCD devices typically include an LCD panel and a backlight unit having a light source (e.g., a cylindrical fluorescent lamp). The LCD panel displays pictures by selectively transmitting light emitted by the backlight unit. Backlight units inherently increase the weight, thickness, and power consumption characteristics of any LCD device it is incorporated within. Depending on the location of the light source with respect to the LCD panel, backlight units can be generally classified as either direct-type or edge-type.

Edge-type backlight units generally include a fluorescent lamp provided along a lateral side of a light-guide plate that is disposed beneath an LCD panel. The light-guide plate diverts light emitted by the fluorescent lamp from its lateral side to a backside of the LCD panel to uniformly transmit the emitted light into the LCD panel. Because light emitted by the fluorescent lamp must be diverted and transmitted by the light-guide plate, LCD devices incorporating edge-type backlight units undesirably display pictures at a low brightness. Moreover, edge-type backlight units tend to require complex optical designs and processing technologies to successfully divert and transmit light of a uniform intensity to the LCD panel.

Direct-type backlight units generally include a plurality of fluorescent lamps (or one bent fluorescent lamp) provided beneath an LCD panel. Unobstructed, the light transmitted by the LCD panel undesirably forms an image on the LCD panel in the same shape as the fluorescent lamp. Therefore, the fluorescent lamp is typically spaced apart from the LCD panel by a predetermined amount and a light-diffusion sheet is disposed between the LCD panel and the fluorescent lamp to ensure that the LCD panel is illuminated with light having a uniform intensity. Due to the construction outlined above, it is difficult to form direct-type backlight units that are thin. Accordingly, much effort has recently been made to research and develop a flat light-emitting lamp having a flat panel shape that is disposed adjacent to an LCD panel.

Moreover, in Korean Patent Laid-Open No. P2002-0085238 (Nov. 16, 2002), a backlight unit, provided as a plasma lamp, was proposed. While such a plasma lamp is thin and has a high brightness, an internal pressure between the upper and lower glass substrates of the plasma lamp is lower than the external, atmospheric pressure. Therefore, the substrates must be sufficiently thick to prevent the plasma lamp from breaking. However, as the thickness of the glass substrates increases, the weight of the plasma lamp undesirably increases. Moreover, ball- or cross-type spacers/barrier ribs must be provided between the upper and lower substrates to support the substrates across a wide area. Upon incorporating such spacer/barrier ribs, the overall thickness of the plasma lamp increases. Moreover, heat generated during operation of the plasma lamp undesirably shortens the lifetime of the plasma lamp.

SUMMARY OF THE INVENTION

Accordingly, the principles of the present invention are directed to a flat light-emitting lamp, a method of fabricating such a flat light-emitting lamp, and to a liquid crystal display incorporating such a flat light-emitting lamp that substantially obviates one or more of the problems due to limitations and disadvantages of the related art.

An advantage of the present invention provides a flat light-emitting lamp having a high and uniform brightness, a high operating efficiency, and a thin profile, a method of fabricating such a flat light-emitting lamp, and a liquid crystal display (LCD) device using such a flat light-emitting lamp.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a flat light-emitting lamp may, for example, include a first common discharge unit for producing a first electrical discharge according to a first AC waveform having a first phase, a second common discharge unit for producing a second electrical discharge according to a second AC waveform having a second phase, wherein the second phase is different from the first phase, and a plurality of discharge tubes each having first and second ends, wherein each first end is connected to the first common discharge unit and wherein each second end is connected to the second common discharge unit, wherein the plurality of discharge tubes emit light according to the electrical discharges of the first and second common discharge units.

In another aspect of the present invention, a liquid crystal display (LCD) may, for example, include an LCD panel, and a backlight unit irradiating light to the LCD panel, wherein the backlight unit includes a lamp that, in turn, may, for example, include a first common discharge unit for producing a first electrical discharge according to a first AC waveform having a first phase, a second common discharge unit for producing a second electrical discharge according to a second AC waveform having a second phase, wherein the second phase is different from the first phase, and a plurality of discharge tubes having first and second ends, wherein each first end is connected to the first common discharge unit and wherein each second end is connected to the second common discharge unit, wherein the plurality of discharge tubes emit light according to the electrical discharges of the first and second common discharge units.

In another aspect of the present invention, a method of fabricating a lamp may, for example, include preparing first and second common discharge tubes, preparing a plurality of discharge tubes each having first and second ends, joining the first ends of the plurality of discharge tubes to the first common discharge tube and joining the second ends of the plurality of discharge tubes to the second common discharge tube, forming first and second common electrodes on exteriors of the first and second common discharge tubes, respectively, injecting discharge gas into the first and second common discharge tubes and the plurality of discharge tubes via at least one gas inlet provided to at least one side of at least one of the first and second common discharge tubes, and sealing the at least one gas inlet.

In still another aspect of the present invention, a method of fabricating a liquid crystal display (LCD) may, for example, include providing an LCD panel, forming a backlight unit, and arranging the backlight unit beneath the LCD panel, wherein forming the backlight unit may, for example, include forming a lamp that, in turn, may, for example, include preparing first and second common discharge tubes, preparing a plurality of discharge tubes each having first and second ends, joining the first ends of the plurality of discharge tubes to the first common discharge tube and joining the second ends of the plurality of discharge tubes to the second common discharge tube, forming first and second common electrodes on exteriors of the first and second common discharge tubes, respectively, injecting discharge gas into the first and second common discharge tubes and the plurality of discharge tubes via at least one gas inlet provided to at least one side of at least one of the first and second common discharge tubes, and sealing the at least one gas inlet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
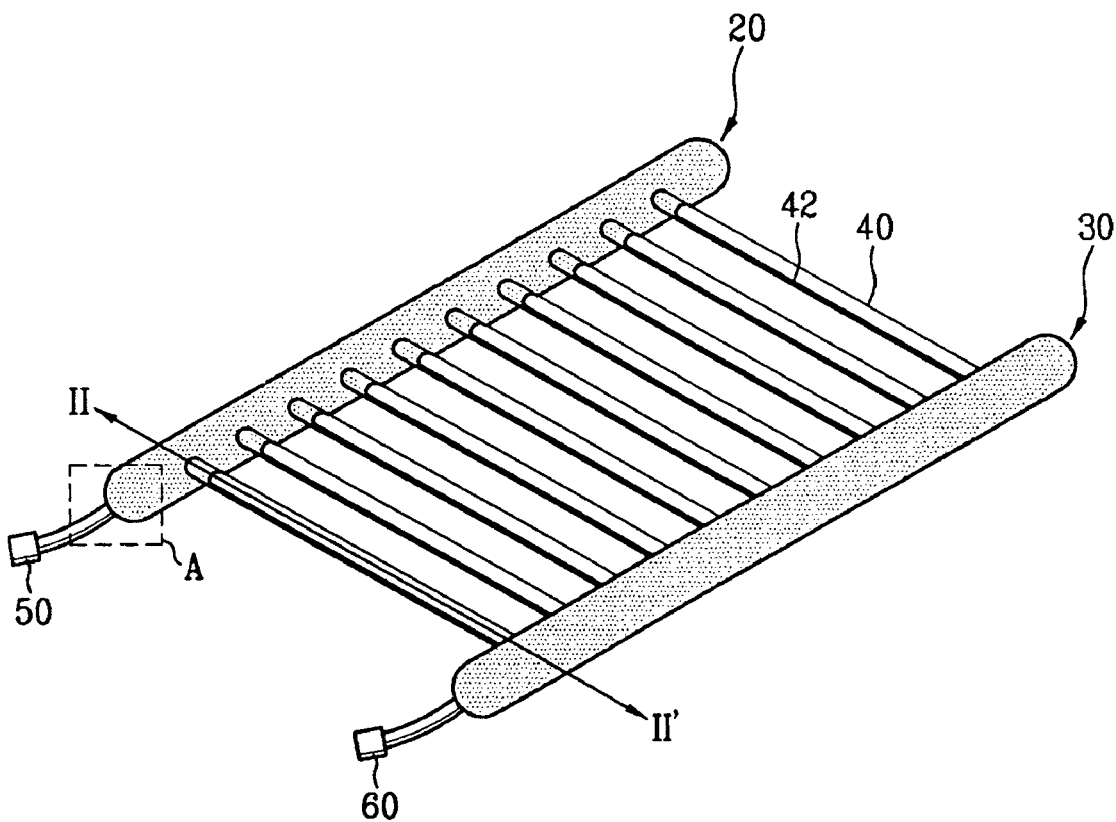
FIG. 1 illustrates a perspective view of a flat light-emitting lamp according to a first embodiment of the present invention.
Figure 2:
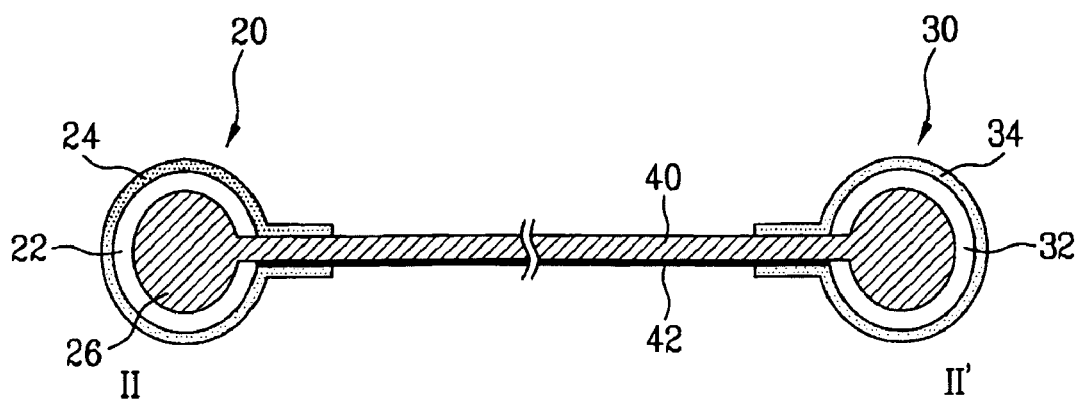
FIG. 2 illustrates a cross-sectional view along line II-II' as shown in FIG. 1.

FIG. 1 illustrates a perspective view of a flat light-emitting lamp according to a first embodiment of the present invention. FIG. 2 illustrates a cross-sectional view along line II-II' as shown in FIG. 1.

Referring to FIGS. 1 and 2, a flat light-emitting lamp 10 according to a first embodiment of the present invention may, for example, include a first common discharge unit 20, a second common discharge unit 30, and a plurality of discharge tubes 40. In one aspect of the present invention, each discharge tube 40 may, for example, include a first end connected to the first common discharge unit 20 and a second end connected to the second common discharge unit 30. In another aspect of the present invention, the first common discharge unit 20 may produce a first electrical discharge in response to a first AC waveform having a first phase and the second common discharge unit 30 may produce an electrical discharge in response to discharge a second AC waveform having a second phase. In yet another aspect of the present invention, the first phase may be different from the second phase. Accordingly, the plurality of discharge tubes 40 may emit light according to the electrical discharges of the first and second common discharge units 20 and 30.

According to principles of the present embodiment, the first common discharge unit 20 may, for example, include a first common discharge tube 22, a first common electrode 24 covering an exterior of the first common discharge tube 22, and a first connector 50 electrically connected to the first common electrode 24.

In one aspect of the present invention, the first common discharge tube 22 may be formed of a material such as ceramic, glass, or the like. In another aspect of the present invention, the ease with which the first common discharge tube 22 is fabricated, in addition to its anti-corrosion and heat-resistance characteristics, may be enhanced if the first common discharge tube 22 is formed from a ceramic-based material. In yet another aspect of the present invention, the first common discharge tube 22 may have a cylindrical shape (e.g., with a circular or oval cross section).

In one aspect of the present invention, the first common electrode 24 may, for example, be electrochemically coated onto the exterior of the first common discharge tube 22 and may have a predetermined thickness and length. In another aspect of the present invention, the first common electrode 24 may cover at least ⅔ of the surface of the first common discharge tube 22. In yet another aspect of the present invention, the first common electrode 24 may cover at least a portion of the surface of the discharge tubes 40. In still another aspect of the present invention, an insulating layer (not shown) may be formed on the surface of the first common electrode 24.

In one aspect of the present invention, the first connector 50 may be electrically connected to the first common electrode 24 and may supply the first AC waveform having the first phase from an inverter (not shown) to the first common electrode 24.

According to principles of the present invention, the second common discharge unit 30 may, for example, include a second common discharge tube 32, a second common electrode 34 covering an exterior of the second common discharge tube 32, and a second connector 60 electrically connected to the second common electrode 34.

In one aspect of the present invention, the second common discharge tube 32 may be formed of a material such as ceramic, glass, or the like. In another aspect of the present invention, the ease with which the second common discharge tube 32 is fabricated, in addition to its anti-corrosion and heat-resistance characteristics, may be enhanced if the second common discharge tube 32 is formed from a ceramic-based material. In yet another aspect of the present invention, the second common discharge tube 32 may have a cylindrical shape (e.g., with a circular or oval cross section).

In one aspect of the present invention, the second common electrode 34 may be electrochemically coated onto the exterior of the second common discharge tube 32 and may have a predetermined thickness and length. In another aspect of the present invention, the second common electrode 34 may cover at least ⅔ of the surface of the second common discharge tube 32. In yet another aspect of the present invention, the second common electrode 34 may cover at least a portion of the surface of the discharge tubes 40. In still another aspect of the present invention, an insulating layer (not shown) may be formed on the surface of the second common electrode 34.

In one aspect of the present invention, the second connector 60 may be electrically connected to the second common electrode 34 and may supply the second AC waveform having the second phase from an inverter (not shown) to the second common electrode 34.

According to principles of the present invention, a plurality of discharge tubes 40 may be connected between the first and second common discharge tubes 22 and 32 and may, for example, be equally spaced apart from each other. In one aspect of the present invention, the first end of each discharge tube 40 may penetrate a sidewall of the first common discharge tube 22 and the second end of each discharge tube 40 may penetrate a sidewall of the second common discharge tube 32. Accordingly, the plurality of discharge tubes 40 may be connected in common to the first and second common discharge tubes 22 and 32. Discharge gas 26, may be injected into the interior of the first and second common discharge tubes 22 and 32, which are in fluid communication with each other via the plurality of discharge tubes 40.

A fluorescent material (not shown) may be coated onto the interior surface of the plurality of discharge tubes 40 and may emit light in response to an electrical discharge of the discharge gas 26. In one aspect of the present invention, a reflective layer 42 may be formed beneath each of the plurality of discharge tubes 40 to reflect light generated within the discharge tube 40 toward an LCD panel (not shown). Accordingly, the reflective layer 42 may reflect downwardly propagating light in an upper direction.

Figure 3:
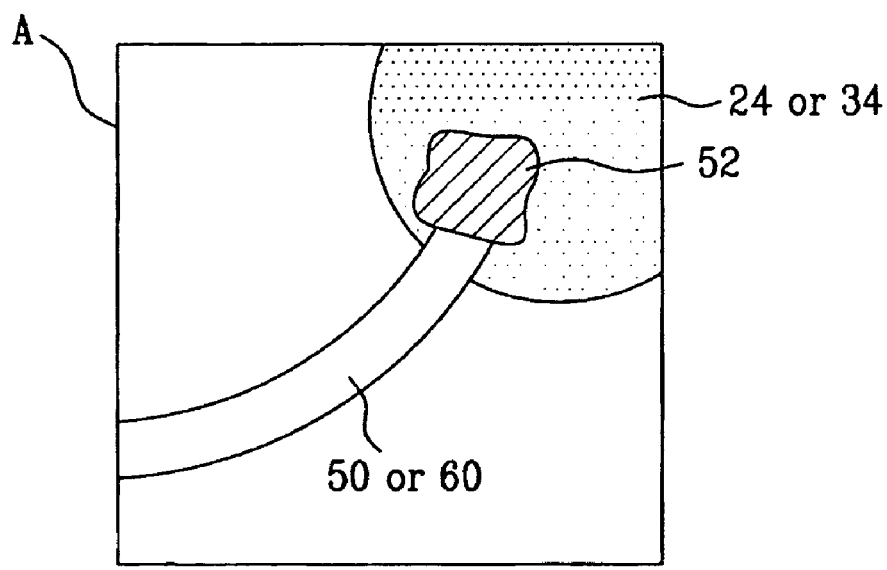
FIG. 3 illustrates a magnified view of region A as shown in FIG. 1 according to one aspect of the first embodiment.

FIG. 3 illustrates a magnified view of region A as shown in FIG. 1 according to one aspect of the first embodiment.

Referring to FIG. 3, the first connector 50 may be electrically connected to the first common electrode 24 via solder material 52. Similarly, the second connector 60 may be electrically connected to the second common electrode 34 via solder material 52. In one aspect of the present invention, the first and second connectors 50 and 60 may be electrically connected to respective ones of the first and second common electrodes 24 and 34 after a portion of the aforementioned insulating layers on the first and second common electrodes 24 and 34 have been removed. In another aspect of the present invention, wires of the first and second connectors 50 and 60 may be electrically connected to portions of respective first and second common electrodes 24 and 34 that are exposed by the removed portions of insulating layers via the solder material 52.

Figure 4:
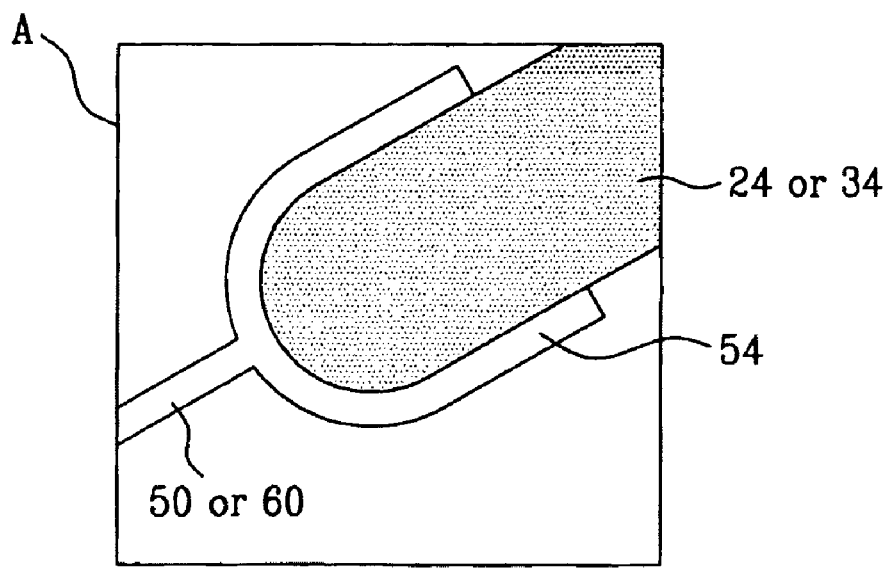
FIG. 4 illustrates another magnified view of region A as shown in FIG. 1 according to another aspect of the first embodiment.

FIG. 4 illustrates another magnified view of region A as shown in FIG. 1 according to another aspect of the first embodiment.

Referring to FIG. 4, the first connector 50 may be electrically connected to the first common electrode 24 via a holder 54. In one aspect of the present invention, the holder 54 may be connected to the first connector 50 and have dimensions that are substantially conformal to dimensions of the first common electrode 24, for receiving and electrically contacting the first common electrode 24. Similarly, another holder 54 may be connected to the second connector 50 and have dimensions that are substantially conformal to dimensions of the second common electrode 34 for receiving and electrically contacting the second common electrode 34. In one aspect of the present invention, the first and second connectors 50 and 60 may be electrically connected to respective ones of the first and second common electrodes 24 and 34 after a portion of the aforementioned insulating layers on the first and second common electrodes 24 and 34 have been removed. In another aspect of the present invention, wires of the first and second connectors 50 and 60 may be electrically connected to portions of respective first and second common electrodes 24 and 34 that are exposed by the removed portions of insulating layers via the holders 54.

Figure 5:
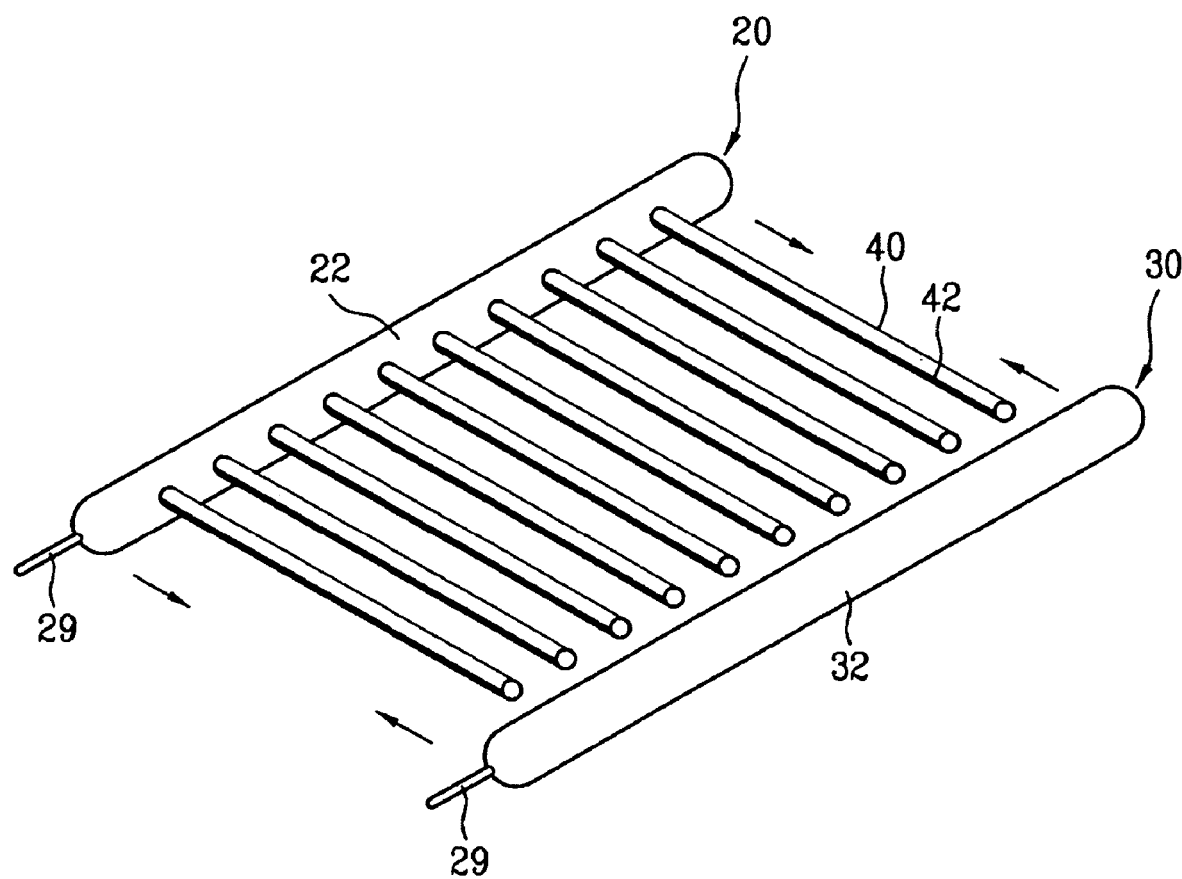
FIGS. 5 to 7 illustrate an exemplary method of fabricating the flat light-emitting lamp according to the first embodiment of the present invention.
Figure 6:
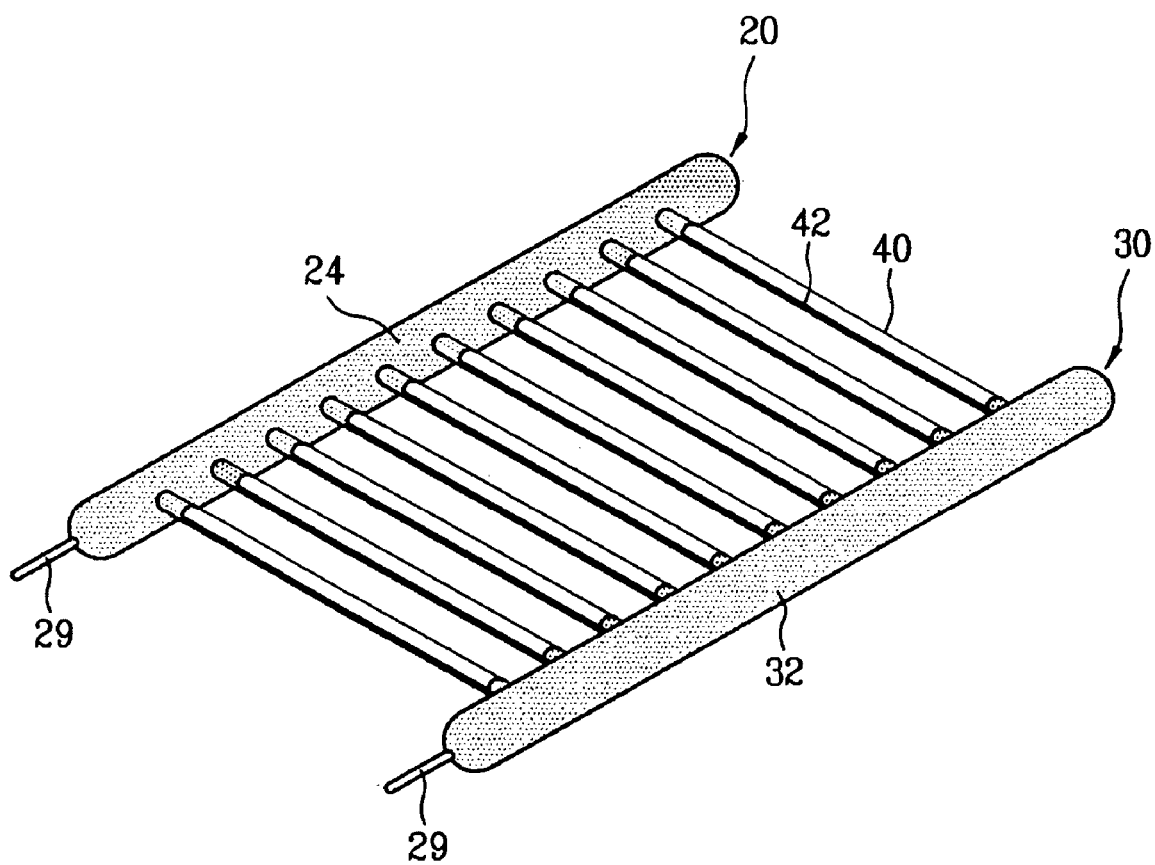
Figure 7:
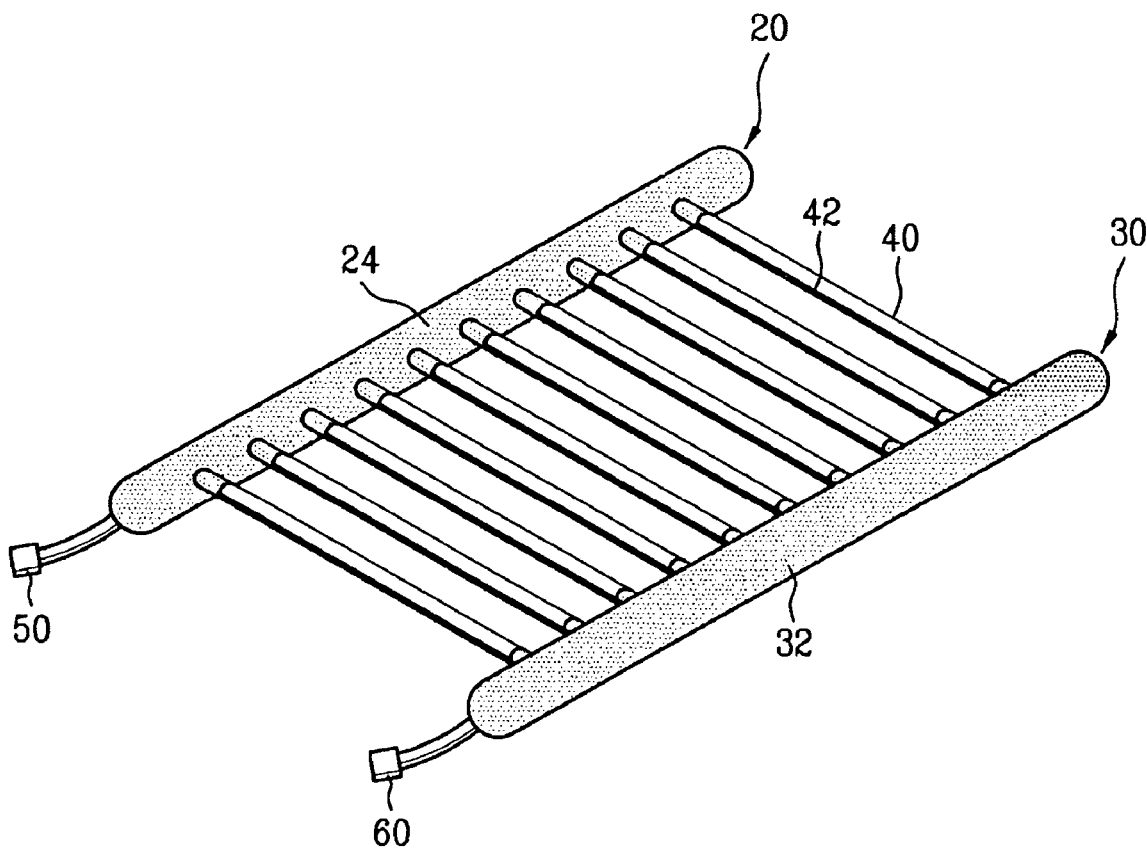

FIGS. 5 to 7 illustrate an exemplary method of fabricating the flat light-emitting lamp according to the first embodiment of the present invention.

Referring to FIG. 5, the aforementioned first and second common discharge tubes 22 and 32, respectively, are fabricated. In one aspect of the present invention, the first and second common discharge tubes 22 and 32, respectively, may be fabricated to have generally cylindrical shapes. In another aspect of the present invention, the first and second common discharge tubes 22 and 32 may, for example, be made of a glass-based material. During fabrication, gas inlets 29 may be formed at first sides of the first and second common discharge tubes 22 and 32 to facilitate the injection of the discharge gas 26.

After fabricating the first and second common discharge tubes 22 and 32, a plurality of discharge tubes 40 may be joined in common to the first and second common discharge tubes 22 and 32. In one aspect of the present invention, the interior surfaces of the plurality of discharge tubes 40 may be coated with a fluorescent material prior to joining the plurality of discharge tubes 40 to the first and second common discharge tubes 22 and 32. In another aspect of the present invention, a reflective layer 42 may be formed on bottom exterior portions of each of the plurality of discharge tubes 40 prior to joining the plurality of discharge tubes 40 to the first and second common discharge tubes 22 and 32.

Referring to FIG. 6, the first and second common electrodes 24 and 34 may be coated onto the exterior of the first and second common discharge tubes 22 and 32, respectively. In one aspect of the present invention, the first and second common electrodes 24 and 34 may be coated to a predetermined thickness and length. In another aspect of the present invention, the first and second common electrodes 24 and 34 may be coated after joining the plurality of discharge tubes 40 to the first and second common discharge tubes 22 and 32. Next, discharge gas 26 may be injected into the first and second common discharge tubes 22 and 32 via the gas inlets 29. After injecting the discharge gas 26, the gas inlets 29 may be sealed. Accordingly, the first and second common discharge tubes 22 and 32, in addition to the plurality of discharge tubes 40, may be filled with discharge gas 26.

Referring to FIG. 7, the first and second connectors 50 and 60 may be electrically connected to the first and second electrodes 24 and 34 of the first and second common discharge tubes 22 and 32, respectively, to complete fabrication of a flat light-emitting lamp 10 including, among other elements, a plurality of discharge tubes 40 joined in common to the first and second common discharge tubes 22 and 32.

According to the principles of the first embodiment of the present invention, AC waveforms of different phases may be applied to the first and second common electrodes 24 and 34 via the first and second connectors 50 and 60, respectively, to generate electric discharges at the first and second common discharge tubes 22 and 32. Accordingly, even if a relatively low voltage is applied to the first and second common electrodes 24 and 34, a plasma discharge is produced within the first and second common discharge tubes 22 and 32. Because the interior of each discharge tube 40 is in fluid communication with the interior of the first and second common discharge tubes 22 and 32, the plasma discharge in the first and second common discharge tubes 22 and 32 is transferred to the discharge tubes 40. Once transferred, the plasma discharge excites the fluorescent material coated on the inside of each discharge tube 40 and visible light is generated. Further, a portion of light generated at each of the discharge tubes 40 is reflected by the reflective layer 42.

Figure 8:
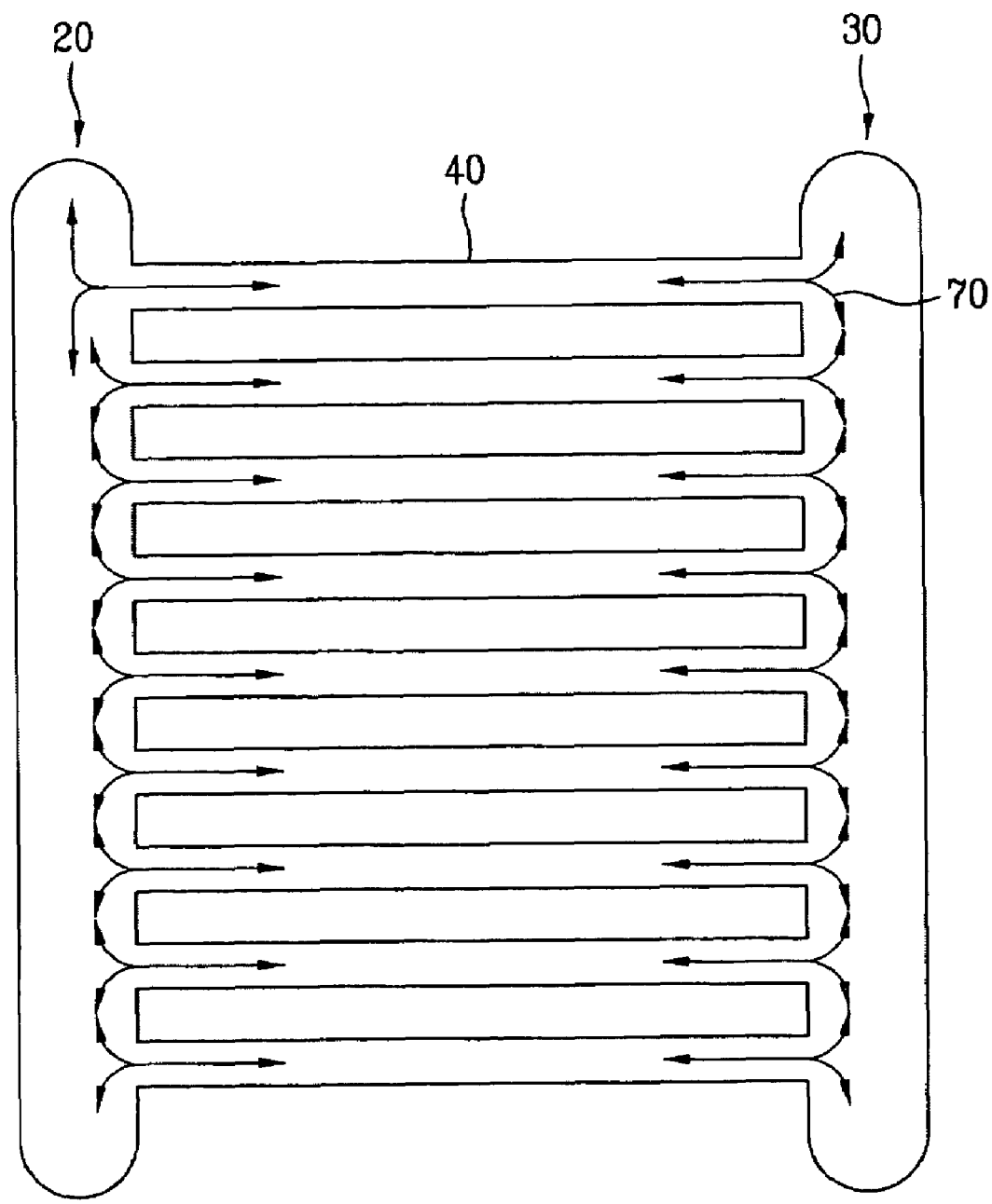
FIG. 8 schematically illustrates a path of discharge gas in the flat light-emitting lamp according to the first embodiment of the present invention.
Figure 9:
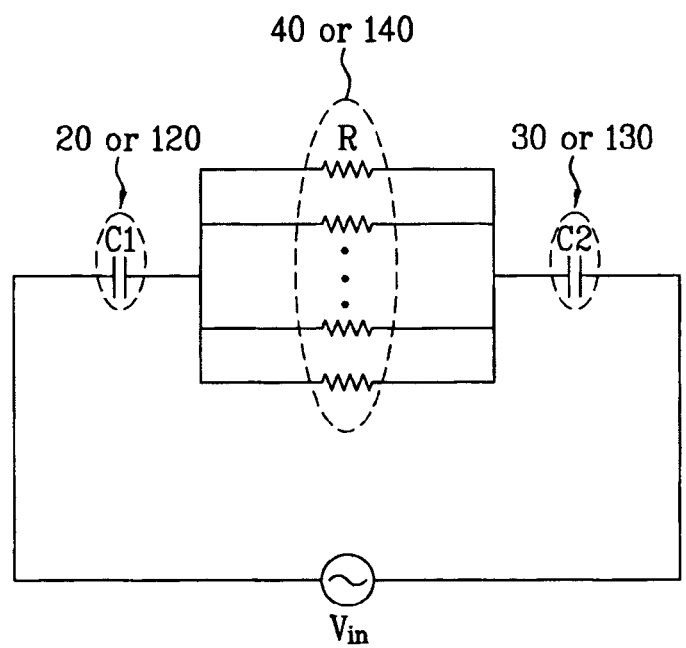
FIG. 9 illustrates an equivalent circuit diagram of a flat light-emitting lamp according to principles of the present invention.

FIG. 8 schematically illustrates a path of discharge gas in the flat light-emitting lamp according to the first embodiment of the present invention. FIG. 9 illustrates an equivalent circuit diagram of a flat light-emitting lamp according to principles of the present invention.

Referring to FIG. 8, the discharge tubes 40 are joined in common (i.e., an equivalently parallel electrical connection structure) to the first common discharge tube 22, having the first common electrode 24, and to the second common discharge tube 32, having the second common electrode 34. The discharge gas 26 flows along paths 70 through the first and second common discharge tubes 22 and 32 and the plurality of discharge tubes 40 via a convection current of the discharge gas 26 to generate the visible light at the discharge tubes 40. Therefore, and while referring to FIG. 9, the first and second common electrodes 24 and 34 are electrically equivalent to first and second capacitors C1 and C2, respectively, and each discharge tube 40 is electrically equivalent to a resistor R. Accordingly, even if parasitic capacitances of the discharge tubes 40 are different, the current balance of the flat light-emitting lamp 10 can be maintained due to the common connection of the discharge tubes 40 with the first and second common discharge tubes 22 and 32 and to the uniform flow of discharge gas 26 through the discharge tubes 40 and the first and second common discharge tubes 22 and 32. Therefore, and in accordance with the principles of the present embodiment, the flat light-emitting lamp 10 can generate light at a substantially uniform brightness. Moreover, the first and second common electrodes 24 and 34 have an effective width that is less than the total width of external electrodes that would need to be equivalently provided to each of the discharge tubes 40. Therefore, and in accordance with the principles of the present embodiment, the flat light-emitting lamp 10 can generate light using electrodes having a reduced width.

Figure 10:
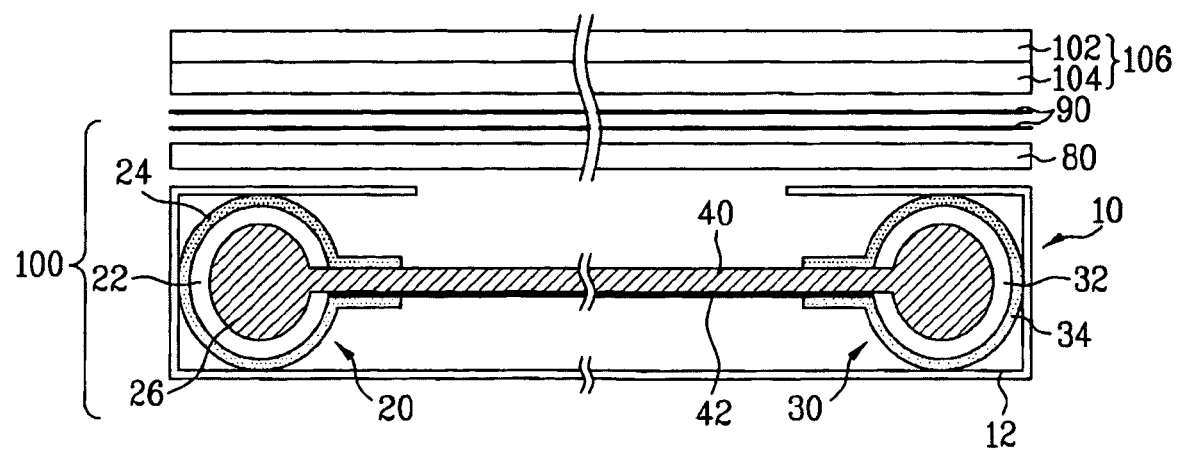
FIG. 10 illustrates a cross-sectional view of a liquid crystal display incorporating the flat light-emitting lamp according to the first embodiment of the present invention.

FIG. 10 illustrates a cross-sectional view of a liquid crystal display incorporating the flat light-emitting lamp according to the first embodiment of the present invention.

Referring to FIG. 10, an LCD device incorporating the flat light-emitting lamp 10 described above with respect to the first embodiment of the present invention may, for example, include an LCD panel 106 and a backlight unit 100. Accordingly, the backlight unit 100 may irradiate light to the LCD panel 106 using the aforementioned flat light-emitting lamp 10.

According to principles of the present invention, the LCD panel 106 may, for example, include an upper substrate 102 and a lower substrate 104. In one aspect of the present invention, a color filter, a common electrode, a black matrix, etc., (all not shown) may be formed on the upper substrate 102. In another aspect of the present invention, signal lines (e.g., data lines, gate lines, etc.) may, for example, be formed on the lower substrate 104, pixel electrodes may be formed in pixel areas defined between the data and gate lines, and thin film transistors (TFTs) may be provided at crossings of the data and gate lines and be connected to corresponding pixel electrodes. According to principles of the present invention, the TFTs may switch video signals from data lines to corresponding pixel electrodes in response to scan signals (i.e., gate pulses) applied to the gate lines. The LCD panel 106 may also include data and gate pad areas (not shown) connected to respective ones of the data and gate lines. An upper polarizing plate (not shown) may be attached to an upper side of the upper substrate 102 (i.e., front side of the LCD panel 106) and a lower polarizing plate (not shown) may be attached to a lower side of the lower substrate 104 (i.e., backside of the LCD panel 106).

As discussed above the flat light-emitting lamp 10 may comprise a plurality of discharge tubes 40 commonly connected to first and second common discharge tubes 22 and 32. Accordingly, the flat light-emitting lamp 10 may use AC waveforms of differing phases applied from the first and second common electrodes 24 and 34 to excite discharge gas 26 flowing through the first and second common discharge tubes 22 and 32, and through the plurality of discharge tubes 40, to emit light of a uniform brightness. According to principles of the present invention, the flat light-emitting lamp 10 may irradiate the emitted light toward the backside of the LCD panel 106.

According to principles of the present invention, the backlight unit 100 may further include a lamp housing 12 that encloses a front side edge, lateral sides, and an entire lower side of the flat light-emitting lamp 10. The backlight unit 100 may further include a diffusion plate 80 disposed over the flat light-emitting lamp 10 and a plurality of optical sheets 90 disposed on the diffusion plate 80. In one aspect of the present invention, the diffusion plate 80 may diffuse the light emitted by the flat light-emitting lamp 10 and transmit the diffused light to the plurality of optical sheets 90. In another aspect of the present invention, each of the optical sheets 90 may divert a transmission path of the diffused light such that the diffused light is uniformly transmitted to the backside of the LCD panel 106, thereby enhancing the brightness of the LCD panel 106.

The LCD device described above with respect to FIG. 10 is thinner than the related art LCD devices discussed above because the flat light-emitting lamp 10 of the first embodiment of the present invention is thin. Moreover, light having a uniform brightness can be applied toward the backside of the LCD panel 106, thereby enhancing the brightness of the LCD device.

Figure 11:
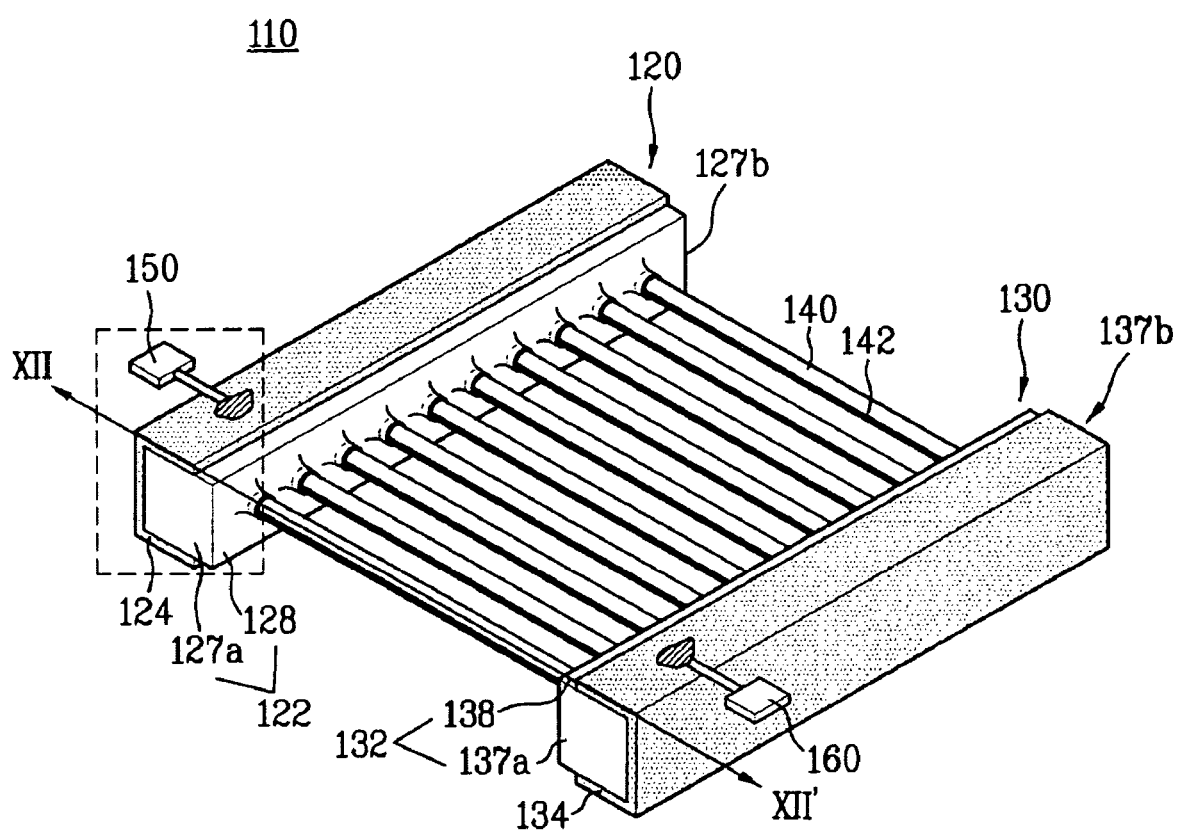
FIG. 11 illustrates a perspective view of a flat light-emitting lamp according to a first embodiment of the present invention.
Figure 12:
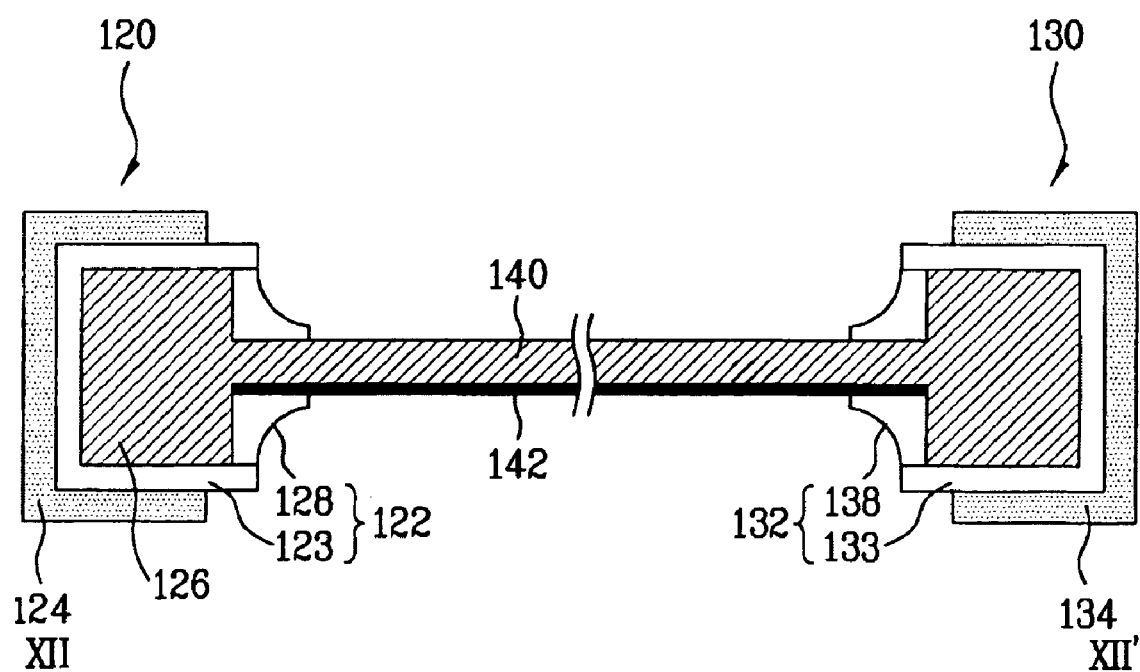
FIG. 12 illustrates a cross-sectional view along line XII-XII' as shown in FIG. 1.

FIG. 11 illustrates a perspective view of a flat light-emitting lamp according to a first embodiment of the present invention. FIG. 12 illustrates a cross-sectional view along line XII-XII' as shown in FIG. 11.

Referring to FIGS. 11 and 12, a flat light-emitting lamp 110 according to a second embodiment of the present invention may, for example, include a first common discharge unit 120, a second common discharge unit 130, and a plurality of discharge tubes 140. In one aspect of the present invention, each discharge tube 140 may, for example, include a first end connected to the first common discharge unit 120 and a second end connected to the second common discharge unit 130. In another aspect of the present invention, the first common discharge unit 120 may produce a first electrical discharge in response to a first AC waveform having a first phase and the second common discharge unit 130 may produce a second common discharge in response to a second AC waveform having a second phase. In yet another aspect of the present invention, the first phase may be different from the second phase. Accordingly, the plurality of discharge tubes 140 may emit light according to the electrical discharges of the first and second common discharge units 120 and 130.

According to principles of the present embodiment, the first common discharge unit 120 may, for example, include a first common discharge tube 122, a first common electrode 124 covering an exterior of the first common discharge tube 122, and a first connector 150 electrically connected to the first common electrode 124.

In one aspect of the present invention, the first common discharge tube 122 may, for example, include a first rectangular frame 123 having two opposing lateral openings and one longitudinal opening and, therefore, have a generally 'U'-shaped cross-section, a first cover 128 having a generally flat shape to seal the longitudinal opening of the first rectangular frame 123, and first and second sealing plates 127a and 127b to seal the opposing lateral openings of the first rectangular frame 123. In another aspect of the present invention, the first rectangular frame 123 may be formed of a material such as ceramic, glass, or the like. In another aspect of the present invention, the ease with which the first rectangular frame 123 is fabricated, in addition to its anti-corrosion and heat-resistance characteristics, may be enhanced if the first rectangular frame 123 is formed from a ceramic-based material. In yet another aspect of the present invention, the plurality of discharge tubes 140 may be joined to the first cover 128.

In one aspect of the present invention, the first cover 128 may, for example, be formed of the same material as the first rectangular frame 123. In another aspect of the present invention, the first cover 128 may be provided with a plurality of joining holes which are in fluid communication with the interiors of the plurality of discharge tubes 140 joined thereto. In yet another aspect of the present invention, the joining holes may be dimensioned so as to receive the plurality of discharge tubes 140. In still another aspect of the present invention, portions of the first cover 128 surrounding the joining holes may project a predetermined height relative to portions of the first cover 128 not surrounding the joining holes to enable the joining holes to receive a predetermined length of the discharge tubes 140. In an alternate aspect of the present invention, however, ends of the discharge tubes 140 may be dimensioned so as to receive the plurality of joining holes. In a further aspect of the present invention, the first cover 128 may be joined to the longitudinal opening of the first rectangular frame 123 to thereby seal the longitudinal opening of the first rectangular frame 123.

In one aspect of the present invention, the first and second sealing plates 127a and 127b may, for example, be formed of the same material as the first rectangular frame 123. In another aspect of the present invention, the first and second sealing plates 127a and 127b may be joined to the opposing lateral openings of the first rectangular frame 123 to thereby seal the opposing lateral openings of the first rectangular frame 123.

In one aspect of the present invention, the first common electrode 124 may, for example, be electrochemically coated onto the exterior of the first rectangular frame 123 and may have a predetermined thickness and length. In another aspect of the present invention, the first common electrode 124 may cover at least ⅔ of the surface of the first rectangular frame 123. In yet another aspect of the present invention, an insulating layer (not shown) may be formed on the surface of the first common electrode 124.

In one aspect of the present invention, the first connector 150 may be electrically connected to the first common electrode 124 and may supply the first AC waveform having the first phase from an inverter (not shown) to the first common electrode 124.

According to principles of the present embodiment, the second common discharge unit 130 may, for example, include a second common discharge tube 132, a second common electrode 134 covering an exterior of the second common discharge tube 132, and a second connector 160 electrically connected to the second common electrode 134.

In one aspect of the present invention, the second common discharge tube 122 may, for example, include a second rectangular frame 133 having two opposing lateral openings and one longitudinal opening and, therefore, have a generally 'U'-shaped cross-section, a second cover 138 having a generally flat shape to seal the longitudinal opening of the second rectangular frame 133, and third and fourth sealing plates 137a and 137b to seal the opposing lateral openings of the second rectangular frame 133. In another aspect of the present invention, the second rectangular frame 133 may be formed of a material such as ceramic, glass, or the like. In another aspect of the present invention, the ease with which the second rectangular frame 133 is fabricated, in addition to its anti-corrosion and heat-resistance characteristics, may be enhanced if the second rectangular frame 133 is formed from a ceramic-based material. In yet another aspect of the present invention, the plurality of discharge tubes 140 may be joined to the second cover 138.

In one aspect of the present invention, the second cover 138 may, for example, be formed of the same material as the second rectangular frame 133. In another aspect of the present invention, the second cover 138 may be provided with a plurality of joining holes which are in fluid communication with the interiors of the plurality of discharge tubes 140 joined thereto. In yet another aspect of the present invention, the joining holes may be dimensioned so as to receive the plurality of discharge tubes 140. In still another aspect of the present invention, portions of the second cover 138 surrounding the joining holes may project a predetermined height relative to portions of the second cover 138 not surrounding the joining holes to enable the joining holes to receive a predetermined length of the discharge tubes 140. In an alternate aspect of the present invention, however, ends of the discharge tubes 140 may be dimensioned so as to receive the plurality of joining holes. In a further aspect of the present invention, the second cover 138 may be joined to the longitudinal opening of the first rectangular frame 133 to thereby seal the longitudinal opening of the first rectangular frame 123.

In one aspect of the present invention, the third and fourth sealing plates 137a and 137b may, for example, be formed of the same material as the second rectangular frame 133. In another aspect of the present invention, the third and fourth sealing plates 137a and 137b may be joined to the opposing lateral openings of the second rectangular frame 133 to thereby seal the opposing lateral openings of the second rectangular frame 133.

In one aspect of the present invention, the second common electrode 134 may, for example, be electrochemically coated onto the exterior of the second rectangular frame 133 and may have a predetermined thickness and length. In another aspect of the present invention, the second common electrode 134 may cover at least ⅔ of the surface of the second rectangular frame 133. In yet another aspect of the present invention, an insulating layer (not shown) may be formed on the surface of the second common electrode 134.

In one aspect of the present invention, the second connector 160 may be electrically connected to the second common electrode 134 and may supply the second AC waveform having the second phase from an inverter (not shown) to the second common electrode 134.

According to principles of the present invention, a plurality of discharge tubes 140 may be connected between the first and second covers 128 and 138 and may, for example, be equally spaced apart from each other. In one aspect of the present invention, the first end of each discharge tube 140 may penetrate a sidewall of the first cover 128 and the second end of each discharge tube 140 may penetrate a sidewall of the second cover 138. Accordingly, the plurality of discharge tubes 140 may be joined to the first and second covers 128 and 138 and, therefore, may be connected in common to the first and second common discharge tubes 122 and 132. Discharge gas 126, may be injected into the interior of the first and second common discharge tubes 122 and 132, which are in fluid communication with each other via the plurality of discharge tubes 140.

A fluorescent material (not shown) may be coated onto the interior surface of the plurality of discharge tubes 140 to emit light in response to an electrical discharge of the discharge gas 126. In one aspect of the present invention, a reflective layer 142 may be formed beneath each of the plurality of discharge tubes 140 toward an LCD panel (not shown). Accordingly, the reflective layer 142 may reflect downwardly propagating light in an upper direction.

Figure 13:
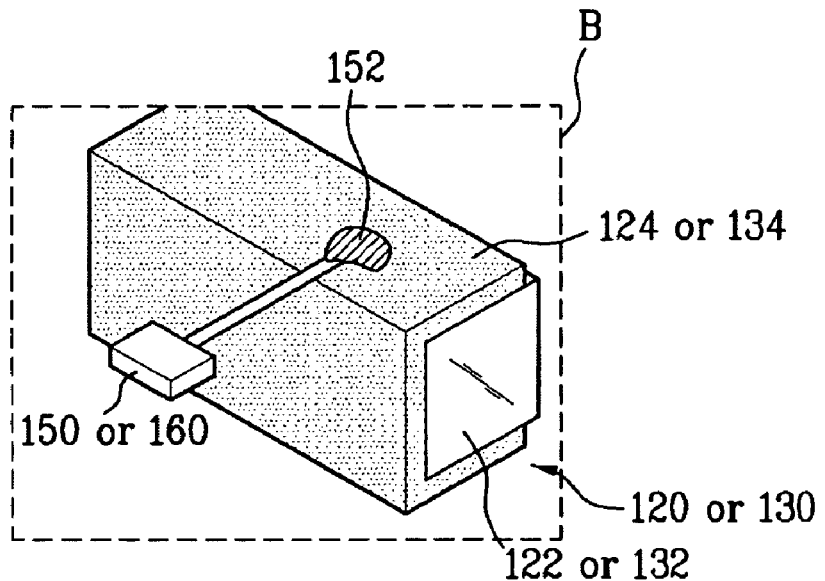
FIG. 13 illustrates a magnified view of region B as shown in FIG. 11 according to one aspect of the second embodiment.

FIG. 13 illustrates a magnified view of region B as shown in FIG. 11 according to one aspect of the second embodiment.

Referring to FIG. 13, the first connector 150 may be electrically connected to the first common electrode 124 via solder material 152. Similarly, the second connector 160 may be electrically connected to the second common electrode 134 via solder material 152. In one aspect of the present invention, the first and second connectors 150 and 160 may be electrically connected to respective ones of the first and second common electrodes 124 and 134 after a portion of the aforementioned insulating layers on the first and second common electrodes 124 and 134 have been removed. In another aspect of the present invention, wires of the first and second connectors 150 and 160 may be electrically connected to portions of respective first and second common electrodes 124 and 134 that are exposed by the removed portions of insulating layers via the solder material 152.

Figure 14:
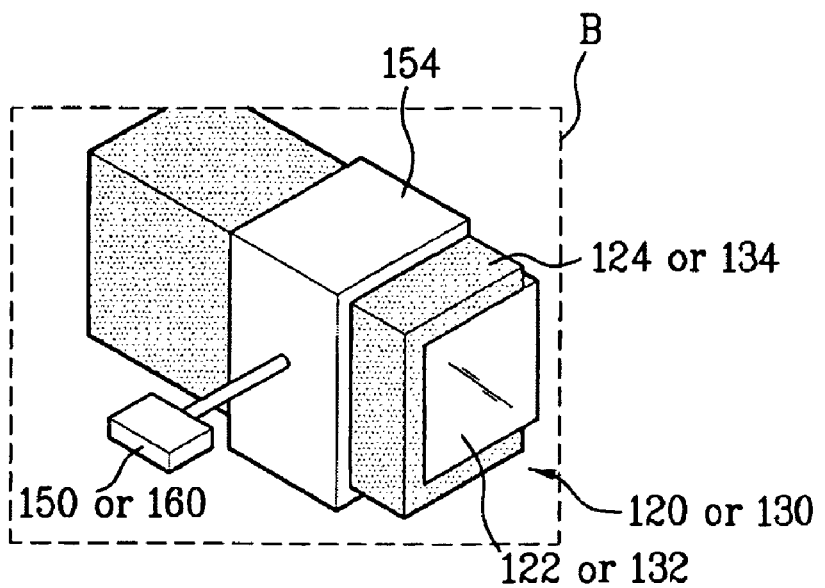
FIG. 14 illustrates another magnified view of region B as shown in FIG. 11 according to another aspect of the second embodiment.

FIG. 14 illustrates another magnified view of region B as shown in FIG. 11 according to another aspect of the second embodiment.

Referring to FIG. 14, the first connector 150 may be electrically connected to the first common electrode 124 via a holder 154. In one aspect of the present invention, the holder 154 may be connected to the first connector 150 and have dimensions that are substantially conformal to dimensions of the first common electrode 124, for receiving and electrically contacting the first common electrode 124. Similarly, another holder 154 may be connected to the second connector 150 and have dimensions that are substantially conformal to dimensions of the second common electrode 134 for receiving and electrically contacting the second common electrode 134. In one aspect of the present invention, the first and second connectors 150 and 160 may be electrically connected to respective ones of the first and second common electrodes 124 and 134 after a portion of the aforementioned insulating layers on the first and second common electrodes 124 and 134 have been removed. In another aspect of the present invention, wires of the first and second connectors 150 and 160 may be electrically connected to portions of respective first and second common electrodes 124 and 134 that are exposed by the removed portions of insulating layers via the holders 154.

FIGS. 15 to 20 illustrate an exemplary method of fabricating the flat light-emitting lamp according to second first embodiment of the present invention.

Figure 15:
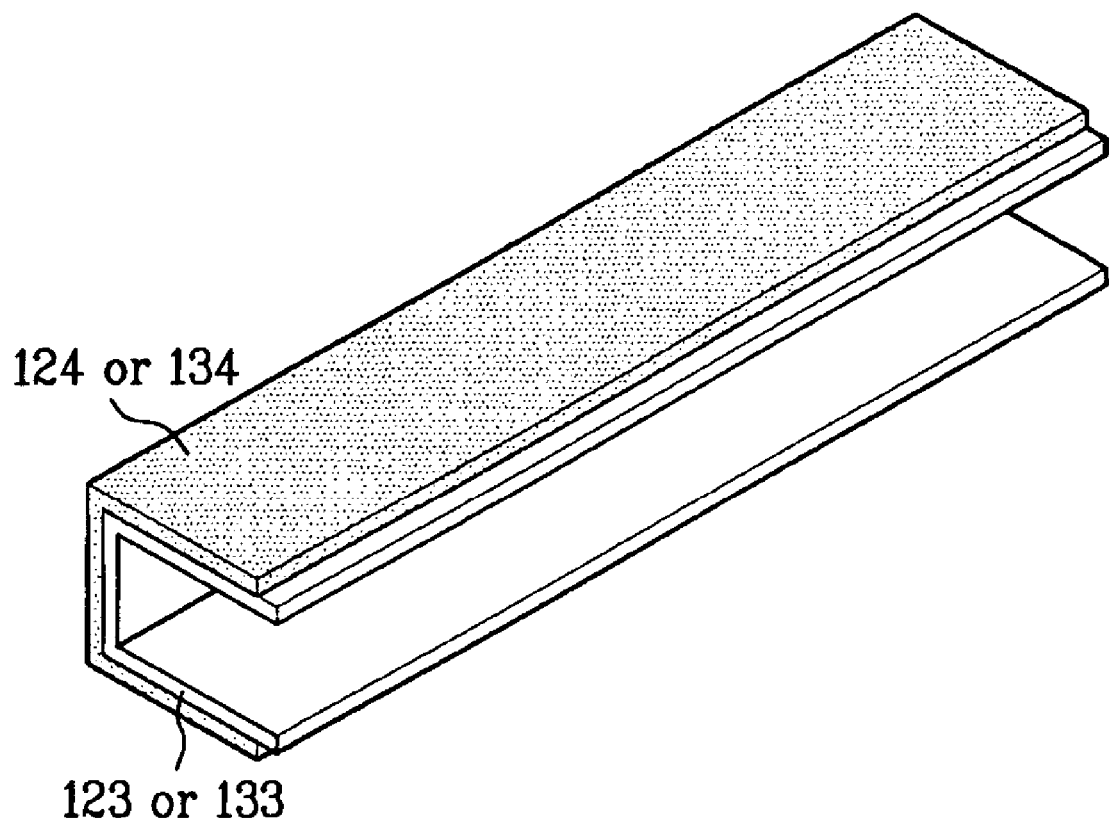
FIGS. 15 to 20 illustrate an exemplary method of fabricating the flat light-emitting lamp according to the second embodiment of the present invention.

Referring to FIG. 15, the aforementioned first and second rectangular frames 123 and 133, respectively, are fabricated. In one aspect of the present invention, the first and second rectangular frames 123 and 133 may be fabricated to have the aforementioned 'U'-shaped cross-section. In another aspect of the present invention, the first and second common discharge tubes 22 and 32 may, for example, be made of a ceramic or glass-based material. Subsequently, the first and second common electrodes 124 and 134 may be coated onto the exterior of the first and second rectangular frames 123 and 133, respectively. In one aspect of the present invention, the first and second common electrodes 124 and 134 may be coated to a predetermined thickness and length.

Figure 16:
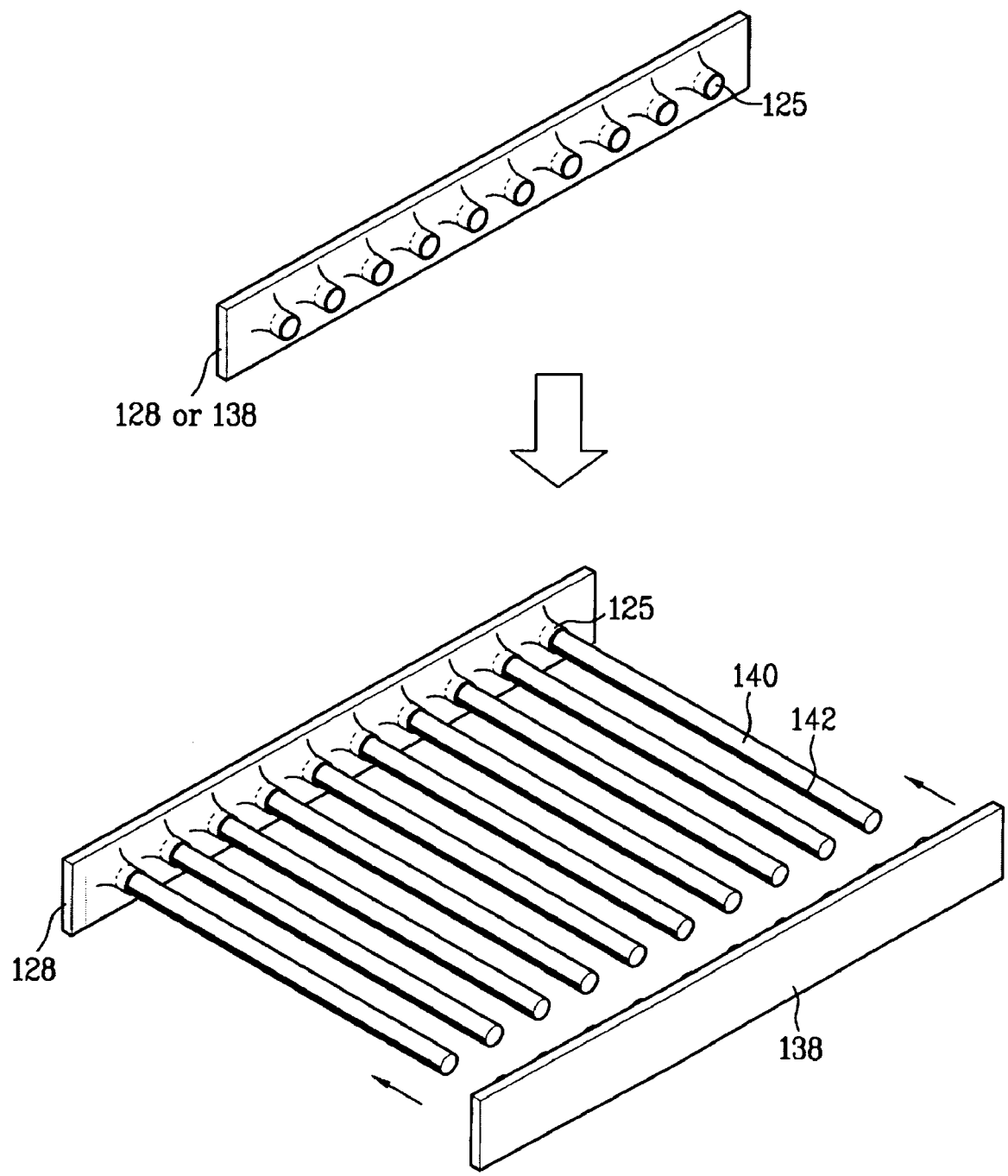

Referring to FIG. 16, the aforementioned first and second covers 128 and 138, each having a plurality of joining holes 125 for receiving the plurality of discharge tubes 140, may be fabricated. In one aspect of the present invention, portions of the first and second covers 128 and 138 surrounding the plurality of joining holes 125 may project a predetermined height relative to respective portions of the first and second covers 128 and 138 not surrounding the plurality of joining holes 125 to receive a predetermined length of the discharge tubes 140. Subsequently, a plurality of discharge tubes 140 may be inserted into the plurality of the joining holes 125 of the first and second covers 128 and 138. In an alternate aspect of the present invention, however, ends of the discharge tubes 140 may be dimensioned so as to receive the plurality of joining holes 125. Accordingly, the plurality of discharge tubes 140 may be connected in common to the first and second covers 128 and 138.

Figure 17:
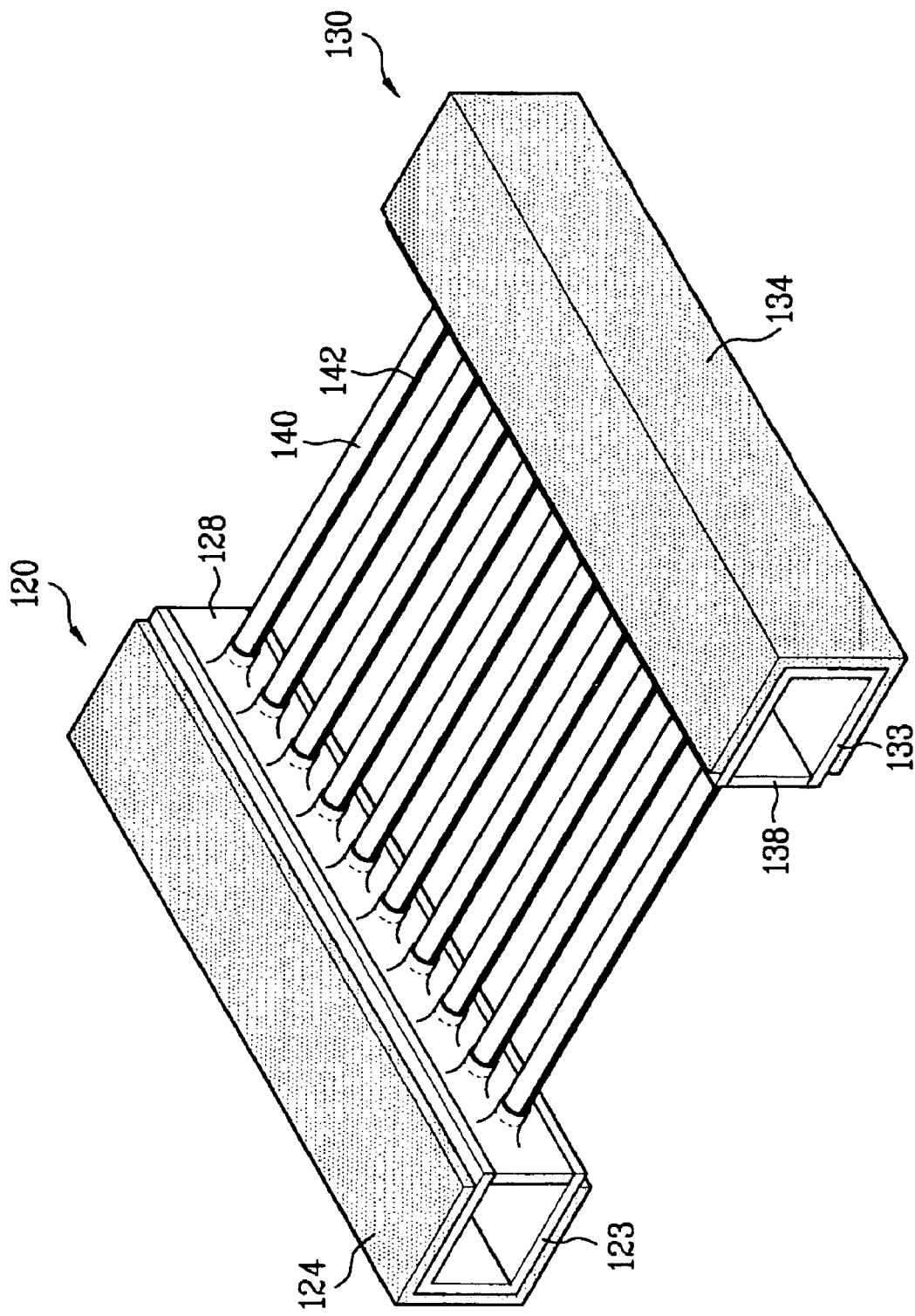

Referring to FIG. 17, the first and second covers 128 and 138, each having the plurality of discharge tubes 140 joined in common thereto, may be joined to the longitudinal openings of the first and second rectangular frames 123 and 133, respectively. Accordingly, the longitudinal openings of the first and second rectangular frames 123 and 133 may be sealed by respective ones of the first and second covers 128 and 138.

Figure 18:
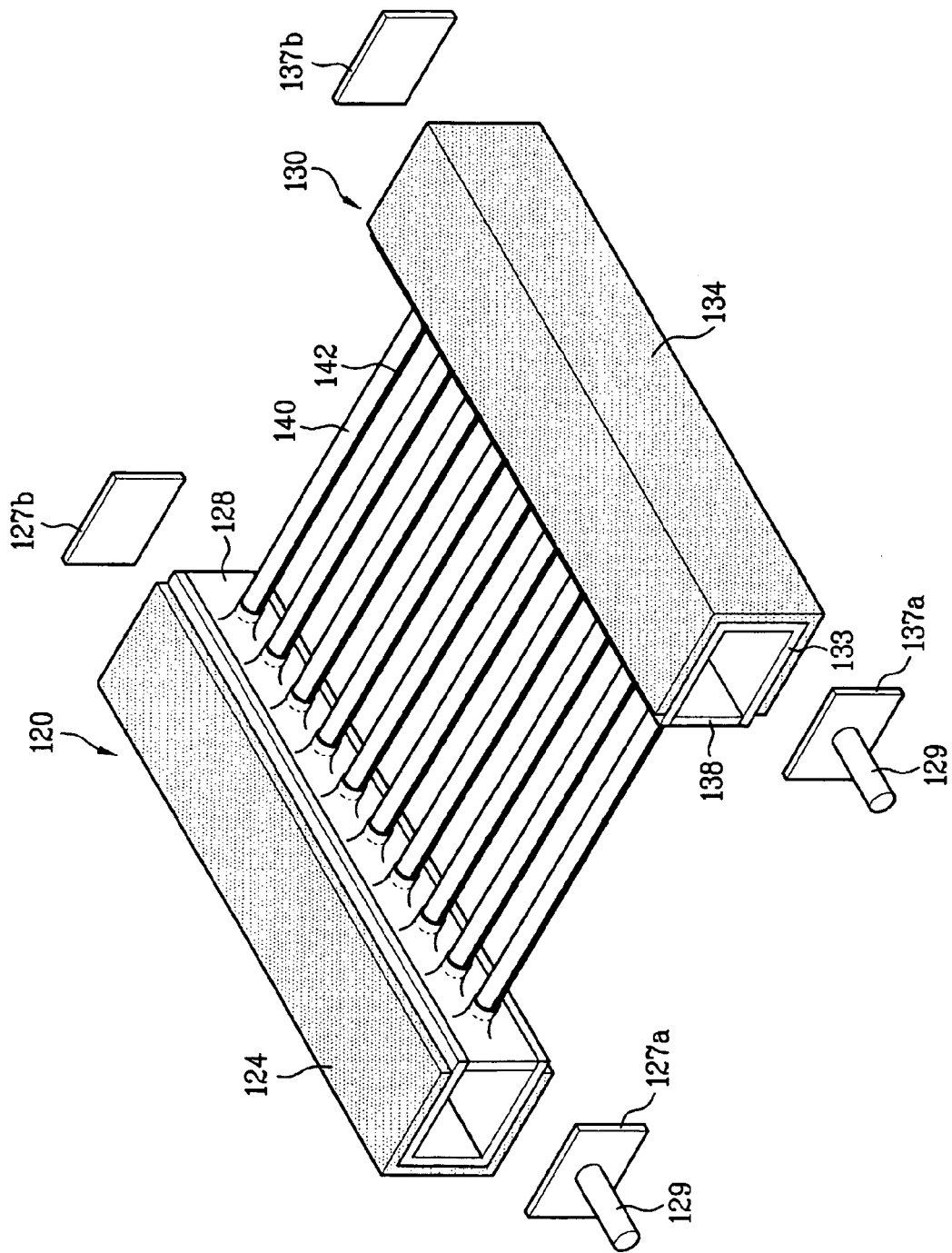

Referring to FIG. 18, first and second sealing plates 127a and 127b may be joined to opposing lateral openings of the first rectangular frame 123, already having the first cover 128 joined thereto. In one aspect of the present invention, a gas inlet 129 may be formed within at least one of the first and second sealing plates 127a and 127b to facilitate the injection of discharge gas 126. Accordingly, the opposing lateral openings of the first rectangular frame 123 may be sealed by the first and second sealing plates 127a and 127b. Upon sealing the longitudinal opening and the opposing lateral openings of the first rectangular frame 123, formation of the first common discharge tube 122 is complete.

Similarly with respect to the first and second sealing plates 127a and 127b, third and fourth sealing plates 137a and 137b may be joined to opposing lateral openings of the second rectangular frame 133, already having the second cover 138 joined thereto. In one aspect of the present invention, a gas inlet 129 may be formed within at least one of the third and fourth sealing plates 137a and 137b to facilitate the injection of discharge gas 126. Accordingly, the opposing lateral openings of the second rectangular frame 133 may be sealed by the third and fourth sealing plates 137a and 137b. Upon sealing the longitudinal opening and the opposing lateral openings of the second rectangular frame 133, formation of the second common discharge tube 132 is complete. In another aspect of the present invention, the aforementioned gas inlet 129 may be formed in at least one of the first to fourth sealing plates 127a, 127b, 137a, and 137b, respectively, such that a gas inlet 129 is formed in one, some, or all of the aforementioned sealing plates.

Figure 19:
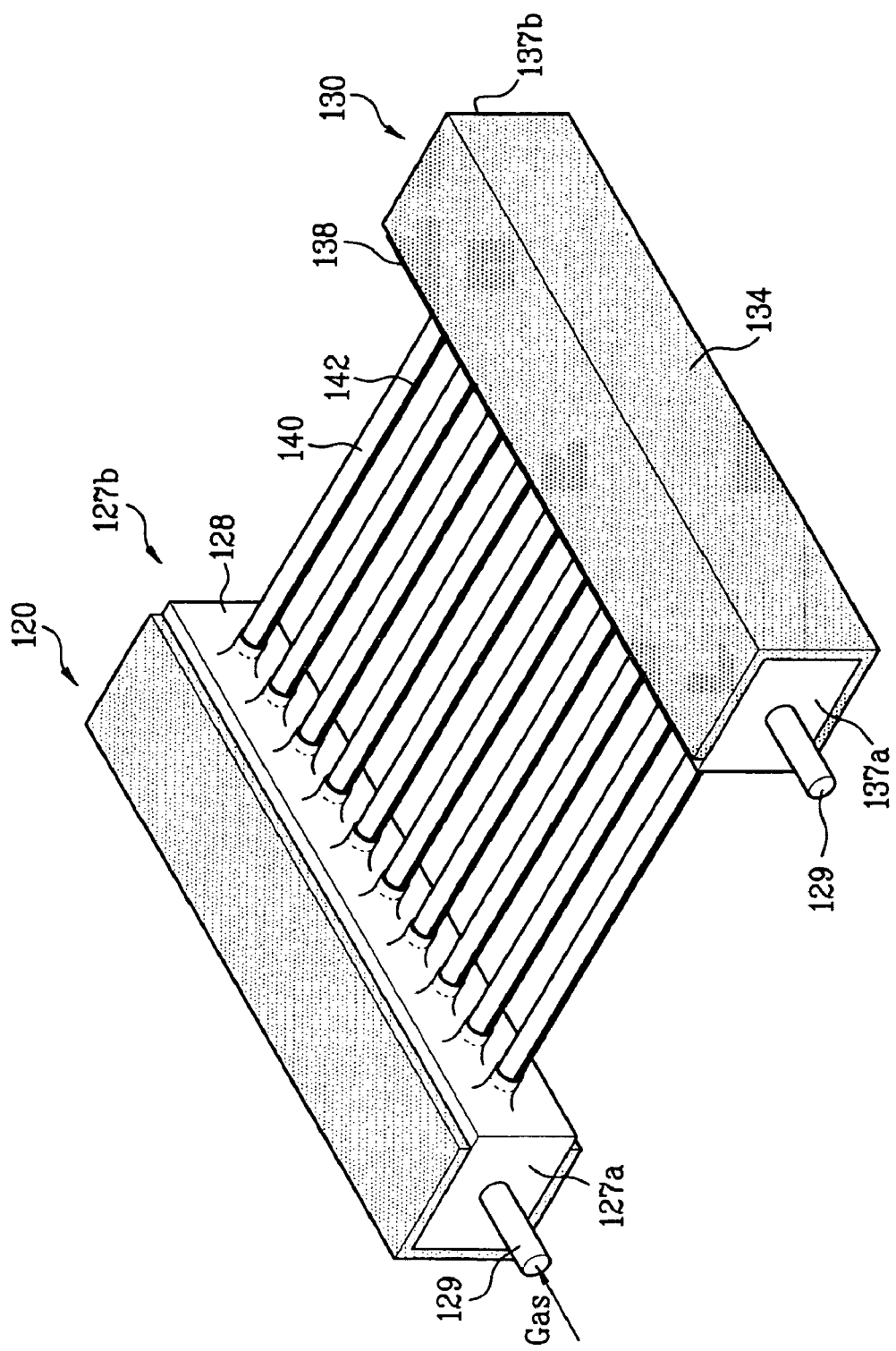

Referring to FIG. 19, discharge gas 126 may be injected into the first and second common discharge tubes 120 and 130 via the gas inlets 129 formed, for example, in the first and third sealing plates 127a and 137a that are joined to lateral openings of the first and second rectangular frames 123 and 133, respectively. After injecting the discharge gas 126, the gas inlets 129 may be sealed. Accordingly, the first and second common discharge tubes 122 and 132, in addition to the plurality of discharge tubes 140, may be filled with the discharge gas 126.

Figure 20:
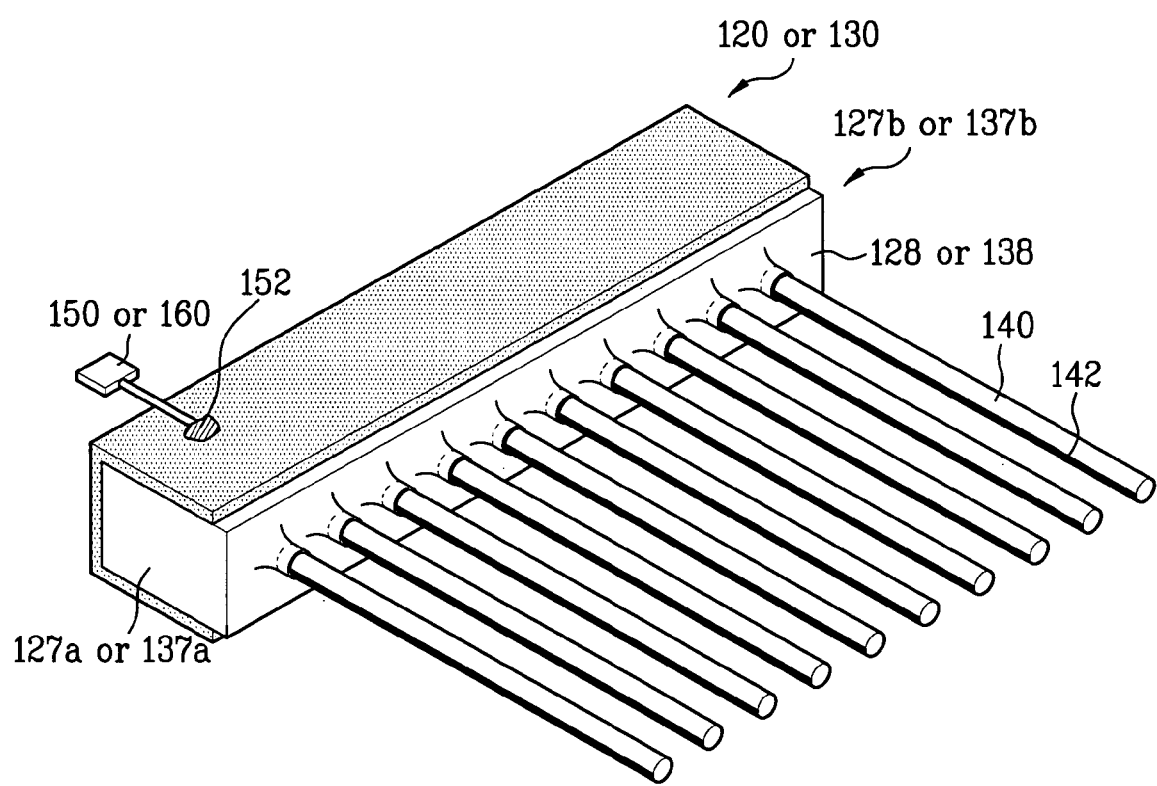

Referring to FIG. 20, the first and second connectors 150 and 160 may be electrically connected to the first and second electrodes 124 and 134 of the first and second common discharge tubes 122 and 132, respectively, to complete fabrication of a flat light-emitting lamp 110 including, among other elements a plurality of discharge tubes 140 joined in common to the first and second common discharge tubes 122 and 132.

According to principles of the second embodiment of the present invention, AC waveforms of differing phases may be applied to the first and second common electrodes 124 and 134 via the first and second connectors 150 and 160, respectively, to generate electric discharges at the first and second common discharge tubes 122 and 132. Accordingly, even if a relatively low voltage is applied to the first and second common electrodes 124 and 134, a plasma discharge is produced within the first and second common discharge tubes 122 and 132. Because the interior of each discharge tube 140 is in fluid communication with the interior of the first and second common discharge tubes 122 and 132, the plasma discharge in the first and second common discharge tubes 122 and 132 is transferred to the discharge tubes 140. Once transferred, the plasma discharge excites the fluorescent material coated on the inside of each discharge tube 140 and visible light is generated. Further, a portion of light generated at each of the discharge tubes 140 is reflected by the reflective layer 142.

Figure 21:
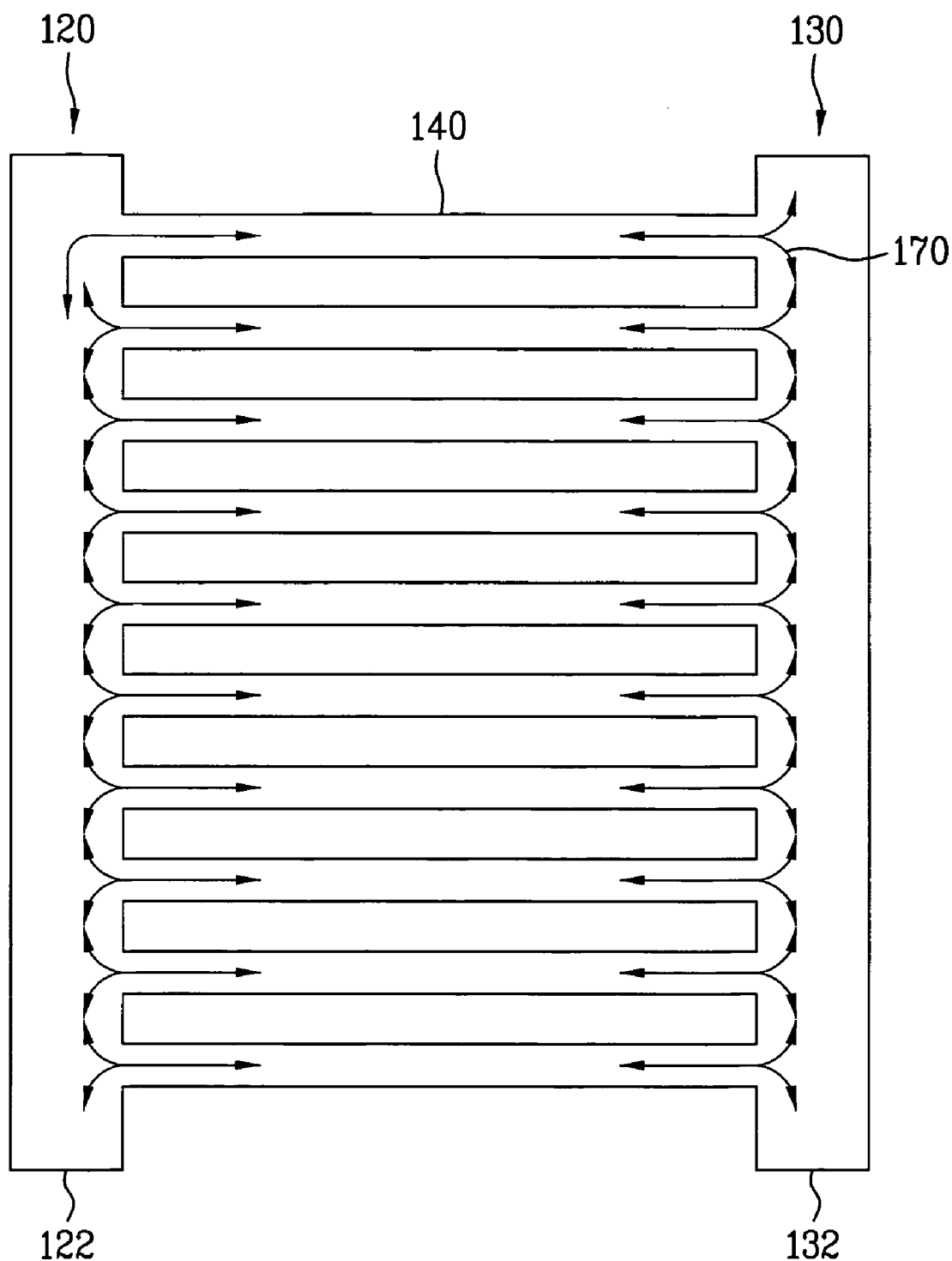
FIG. 21 schematically illustrates a path of discharge gas in the flat light-emitting lamp according to the second embodiment of the present invention.

FIG. 21 schematically illustrates a path of discharge gas in the flat light-emitting lamp according to the second embodiment of the present invention.

Referring to FIG. 21, the discharge tubes 140 are joined in common (i.e., an equivalently parallel electrical connection structure) to the first common discharge tube 122, having the first common electrode 124, and to the second common discharge tube 132, having the second common electrode 134. The discharge gas 126 flows along paths 170 through the first and second common discharge tubes 122 and 132 and the plurality of discharge tubes 140 via a convection current of the discharge gas 126 to generate the visible light at the discharge tubes 140. Therefore, and while referring to FIG. 9, the first and second common electrodes 124 and 134 are electrically equivalent to first and second capacitors C1 and C2, respectively, and each discharge tube 140 is electrically equivalent to a resistor R. Accordingly, even if the parasitic capacitances of the discharge tubes 140 are different, the current balance of the flat light-emitting lamp 110 can be maintained due to the connection of the discharge tubes 140 with the first and second common discharge tubes 122 and 132 and to the uniform flow of discharge gas 126 through the discharge tubes 140 and the first and second common discharge tubes 122 and 132. Therefore, and in accordance with the principles of the present embodiment, the flat light-emitting lamp 110 can generate light at a substantially uniform brightness. Moreover, the first and second common electrodes 124 and 134 have an effective width that is less than the total width of external electrodes that would need to be equivalently provided to each of the discharge tubes 140. Therefore, and in accordance with the principles of the present embodiment, the flat light-emitting lamp 110 can generate light using electrodes having a reduced width.

Figure 22:
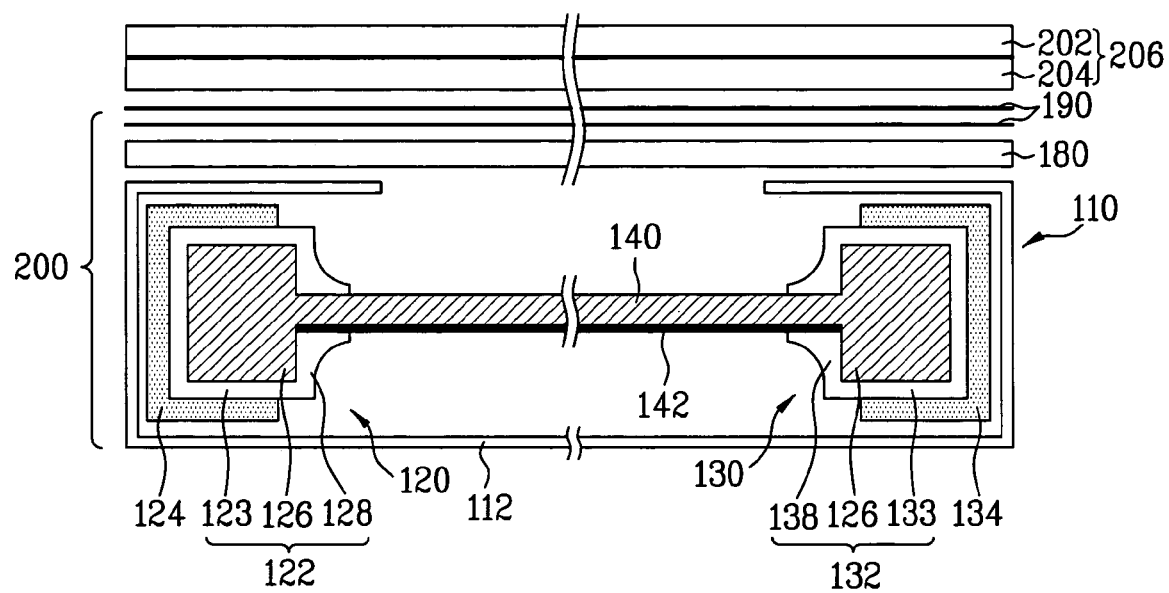
FIG. 22 illustrates a cross-sectional view of a liquid crystal display incorporating the flat light-emitting lamp according to the second embodiment of the present invention.

FIG. 22 illustrates a cross-sectional view of a liquid crystal display incorporating the flat light-emitting lamp according to the second embodiment of the present invention.

Referring to FIG. 22, an LCD device incorporating the flat light-emitting lamp 110 described above with respect to the second embodiment of the present invention may, for example, include an LCD panel 206 and a backlight unit 200. Accordingly, the backlight unit 200 may irradiate light to the LCD panel 206 using the aforementioned flat light-emitting lamp 110.

According to principles of the present invention, the LCD panel 206 may, for example, include an upper substrate 202 and a lower substrate 204. In one aspect of the present invention, a color filter, a common electrode, a black matrix, etc., (all not shown) may be formed on the upper substrate 202. In another aspect of the present invention, signal lines (e.g., data lines, gate lines, etc.) may, for example, be formed on the lower substrate 104, pixel electrodes may be formed in pixel areas defined between the data and gate lines, and thin film transistors (TFTs) may be provided at crossings of the data and gate lines and be connected to corresponding pixel electrodes. According to principles of the present invention, the TFTs may switch video signals from data lines to corresponding pixel electrodes in response to scan signals (i.e., gate pulses) applied to the gate lines. The LCD panel 206 may also include data and gate pad areas (not shown) connected to respective ones of the data and gate lines. An upper polarizing plate (not shown) may be attached to an upper side of the upper substrate 202 (i.e., front side of the LCD panel 206) and a lower polarizing plate (not shown) may be attached to a lower side of the lower substrate 204 (i.e., backside of the LCD panel 206).

As discussed above the flat light-emitting lamp 110 may comprise a plurality of discharge tubes 140 commonly connected to first and second common discharge tubes 122 and 132. Accordingly, the flat light-emitting lamp 110 may use AC waveforms of differing phases applied from the first and second common electrodes 124 and 134 to excite discharge gas 126 flowing through the first and second common discharge tubes 122 and 132 and through the plurality of discharge tubes 140 to emit light of a uniform brightness. According to principles of the present invention, the flat light-emitting lamp 110 may irradiate the emitted light toward the backside of the LCD panel 206.

According to principles of the present invention, the backlight unit 200 may further include a lamp housing 112 that encloses a front side edge, lateral sides, and an entire lower side of the flat light-emitting lamp 110. The backlight unit 200 may further include a diffusion plate 180 disposed over the flat light-emitting lamp 110 and a plurality of optical sheets 190 disposed on the diffusion plate 180. In one aspect of the present invention, the diffusion plate 180 may diffuse the light emitted by the flat light-emitting lamp 110 and transmit the diffused light to the plurality of optical sheets 190. In another aspect of the present invention, each of the optical sheets 190 may divert a transmission path of the diffused light such that the diffused light is uniformly transmitted to the backside of the LCD panel 206, thereby enhancing the brightness of the LCD panel 206.

The LCD device described above with respect to FIG. 22 is thinner than the related art LCD devices discussed above because the flat light-emitting lamp 110 of the second embodiment of the present invention is thin. Moreover, light having a uniform brightness can be applied toward the backside of the LCD panel 206, thereby enhancing the brightness of the LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A lamp, comprising:
a first common discharge unit for producing a first electrical discharge according to a first AC waveform having a first phase;
a second common discharge unit for producing a second electrical discharge according to a second AC waveform having a second phase, wherein the second phase is different from the first phase;
a plurality of discharge tubes each having first and second ends, wherein each first end is connected to the first common discharge unit and wherein each second end is connected to the second common discharge unit, wherein the plurality of discharge tubes emit light according to the electrical discharges produced by the first and second common discharge units; and
a discharge gas injecting into the first and second common discharge units and the plurality of discharge tubes;
wherein the first and second common discharge units each include:
a common discharge tube joined to one end of the plurality of discharge tubes;
a common electrode on an exterior of the common discharge tube; and
a connector electrically connected to the common electrode, wherein the connector is connected to an AC waveform source.

2. The lamp of claim 1, further including a reflective layer at a bottom surface of each of the plurality of discharge tubes.

3. The lamp of claim 1, wherein the common discharge tube is cylindrical.

4. The lamp of claim 1, further including solder material electrically connecting the connector to the common electrode.

5. The lamp of claim 1, further including a holder fitted to the common electrode, wherein the holder electrically connects the connector to the common electrode.

6. The lamp of claim 1, wherein the common discharge tube is formed of a ceramic or a glass.

7. The lamp of claim 1, wherein the common discharge tube is rectangular.

8. The lamp of claim 7, wherein the common discharge tube includes:
a frame having at least one opening; and
at least one cover sealing the at least one opening, wherein the cover is joined to the one end of the plurality of discharge tubes.

9. The lamp of claim 8, wherein the frame includes a 'U'-shaped cross-section.

10. The lamp of claim 9, wherein the at least one opening includes two opposing lateral openings and one longitudinal opening.

11. The lamp of claim 10, wherein the at least one cover includes:
a first cover joined to the longitudinal opening, wherein the first cover is joined to the one end of the plurality of discharge tubes; and
second and third covers joined to the opposing lateral openings.

12. The lamp of claim 11, further including a plurality of joining holes defined within the first cover in fluid communication with the interiors of the plurality of discharge tubes.

13. The lamp of claim 12, wherein the plurality of joining holes receive ends of corresponding ones of the plurality of discharge tubes.

14. The lamp of claim 12, wherein the plurality of joining holes are received within ends of corresponding ones of the plurality of discharge tubes.

15. The lamp of claim 12, wherein portions of the first cover surrounding the plurality of joining holes projects to a predetermined height relative to portions of the first cover not surrounding the plurality of joining holes.

16. A liquid crystal display (LCD), comprising:
an LCD panel;
and a backlight unit irradiating light to the LCD panel, wherein the backlight unit includes a lamp, wherein the lamp includes:
a first common discharge unit for producing a first electrical discharge according to a first AC waveform having a first phase;
a second common discharge unit for producing a second electrical discharge according to a second AC waveform having a second phase, wherein the second phase is different from the first phase;
a plurality of discharge tubes having first and second ends, wherein each first end is connected to the first common discharge unit and wherein each second ends is connected to the second common discharge unit, wherein the plurality of discharge tubes emit light according to the electrical discharges of the first and second common discharge units; and
discharge gas injecting into the first and second common discharge units and the plurality of discharge tubes;
wherein the first and second common discharge units each include:
a common discharge tube joined to one end of the plurality of discharge tubes;
a common electrode formed on an exterior of the common discharge tube; and
a connector electrically connected to the common electrode, wherein the connector is connected to an AC waveform source.

17. The liquid crystal display of claim 16, wherein the backlight unit further includes:
a lamp housing enclosing a front side edge, lateral sides, and a lower side of the lamp;
a diffusion plate over the lamp; and
at least one optical sheet over the diffusion plate.

18. The liquid crystal display of claim 16, further including a reflective layer at a bottom surface of each of the plurality of discharge tubes.

19. The liquid crystal display of claim 16, wherein the common discharge tube is cylindrical.

20. The liquid crystal display of claim 16, further including solder material electrically connecting the connector to the common electrode.

21. The liquid crystal display of claim 16, further including a holder fitted to the common electrode, wherein the holder electrically connects the connector to the common electrode.

22. The liquid crystal display of claim 16, wherein the common discharge tube is formed of a ceramic or a glass.

23. The liquid crystal display of claim 16, wherein the common discharge tube is rectangular.

24. The liquid crystal display of claim 23, wherein the common discharge tube includes:
a frame having at least one opening; and
at least one cover sealing the at least one opening, wherein the cover is joined to the one end of the plurality of discharge tubes.

25. The liquid crystal display of claim 24, wherein the frame includes a 'U'-shaped cross-section.

26. The liquid crystal display of claim 25, wherein the at least one opening includes two opposing lateral openings and one longitudinal opening.

27. The liquid crystal display of claim 26, wherein the at least one cover includes:
a first cover joined to the longitudinal opening, wherein the first cover is joined to the one end of the plurality of discharge tubes; and
second and third covers joined to the opposing lateral openings.

28. The liquid crystal display of claim 27, further including a plurality of joining holes defined within the first cover in fluid communication with the interiors of the plurality of discharge tubes.

29. The liquid crystal display of claim 28, wherein the plurality of joining holes receive ends of corresponding ones of the plurality of discharge tubes.

30. The liquid crystal display of claim 28, wherein the plurality of joining holes are received within ends of corresponding ones of the plurality of discharge tubes.

31. The liquid crystal display of claim 28, wherein portions of the first cover surrounding the plurality of joining holes projects to a predetermined height relative to portions of the first cover not surrounding the plurality of joining holes.

32. A method of fabricating a lamp, comprising:
preparing first and second common discharge tubes;
preparing a plurality of discharge tubes each having first and second ends;
joining the first ends of the plurality of discharge tubes to the first common discharge tube and joining the second ends of the plurality of discharge tubes to the second common discharge tube;
forming first and second common electrodes on exteriors of the first and second common discharge tubes, respectively;
injecting discharge gas into the first and second common discharge tubes and the plurality of discharge tubes via at least one gas inlet provided at least one side of at least one of the first and second common discharge tubes; and
sealing the at least one gas inlet.

33. The method of claim 32, wherein at least one of the first and second common discharge tubes has a cylindrical shape.

34. The method of claim 32, wherein the step of preparing the plurality of discharge tubes includes forming a reflective layer beneath each of the plurality of discharge tubes.

35. The method of claim 32, further comprising electrically connecting connectors to each of the first and second common electrodes, wherein each connector is connected to an AC waveform source.

36. The method of claim 35, further comprising electrically connecting a connector to at least one of the first and second common electrodes via solder material.

37. The method of claim 35, further comprising fitting a holder to at least one of the first and second common electrodes to electrically connect a connector to at least one of the first and second common electrodes.

38. The method of claim 32, further including forming at least one of the first and second common discharge tubes from a ceramic or a glass.

39. The method of claim 32, wherein at least one of the first and second common discharge tubes has a rectangular cross section.

40. The method of claim 39, wherein preparing the at least one of the first and second common discharge tubes includes:
preparing a rectangular frame having two opposing lateral openings and one longitudinal opening to define a 'U'-shaped cross-section preparing a cover;

joining one end of each of the plurality of discharge tubes to the cover;
joining the cover to the longitudinal opening; and
joining sealing plates to the opposing lateral openings.

41. The method of claim 40, further including providing a plurality of joining holes within the cover, wherein joining one end of each of the plurality of discharge tubes to the cover includes placing the plurality of joining holes in fluid communication with the interiors of the plurality of discharge tubes.

42. The method of claim 41, wherein the step of placing the plurality of joining holes in fluid communication with the interiors of the plurality of discharge tubes includes inserting ends of the plurality of discharge tubes into joining holes.

43. The method of claim 41, wherein the step of placing the plurality of joining holes in fluid communication with the interiors of the plurality of discharge tubes includes inserting ends of the plurality of joining holes into the plurality of discharge tubes.

44. The method of claim 41, wherein portions of the cover surrounding the plurality of joining holes project to a predetermined height relative to portions of the cover not surrounding the plurality of joining holes.

45. A method of fabricating a liquid crystal display (LCD), comprising:
providing an LCD panel;
forming a backlight unit; and
arranging the backlight unit beneath the LCD panel, wherein forming the backlight unit includes forming a lamp, wherein forming the lamp includes:
preparing first and second common discharge tubes;
preparing a plurality of discharge tubes each having first and second ends;
joining the first ends of the plurality of discharge tubes to the first common discharge tube and joining the second ends of the plurality of discharge tubes to the second common discharge tube;
forming first and second common electrodes on exteriors of the first and second common discharge tubes, respectively;
injecting discharge gas into the first and second common discharge tubes and the plurality of discharge tubes via at least one gas inlet provided to at least one side of at least one of the first and second common discharge tubes; and
sealing the at least one gas inlet.

46. The method of claim 45, wherein the step of forming the backlight unit further includes:
enclosing a lamp housing around a front side edge, lateral sides, and a lower side of the lamp; arranging a diffusion plate over the lamp; and
arranging at least one optical sheet over the diffusion plate.

47. The method of claim 45, wherein at least one of the first and second common discharge tubes has a cylindrical shape.

48. The method of claim 45, wherein the step of preparing the plurality of discharge tubes includes forming a reflective layer beneath each of the plurality of discharge tubes.

49. The method of claim 45, further comprising electrically connecting connectors to each of the first and second common electrodes, wherein each connector is connected to an AC waveform source.

50. The method of claim 49, further comprising electrically connecting a connector to at least one of the first and second common electrodes via solder material.

51. The method of claim 50, further comprising fitting a holder to at least one of the first and second common electrodes to electrically connect a connector to at least one of the first and second common electrodes.

52. The method of claim 45, further including forming at least one of the first and second common discharge tubes from a ceramic or a glass.

53. The method of claim 45, wherein at least one of the first and second common discharge tubes has a rectangular cross section.

54. The method of claim 53, wherein the step of preparing the at least one of the first and second common discharge tubes includes:
preparing a rectangular frame having two opposing lateral openings and one longitudinal opening to define a 'U'-shaped cross-section preparing a cover;
joining one end of each of the plurality of discharge tubes to the cover;
joining the cover to the longitudinal opening; and
joining sealing plates to the opposing lateral openings.

55. The method of claim 54, further including providing a plurality of joining holes within the cover, wherein joining one end of each of the plurality of discharge tubes to the cover includes placing the plurality of joining holes in fluid communication with the interiors of the plurality of discharge tubes.

56. The method of claim 55, wherein the step of placing the plurality of joining holes in fluid communication with the interiors of the plurality of discharge tubes includes inserting ends of the plurality of discharge tubes into joining holes.

57. The method of claim 55, wherein the step of placing the plurality of joining holes in fluid communication with the interiors of the plurality of discharge tubes includes inserting ends of the plurality of joining holes into the plurality of discharge tubes.

58. The method of claim 55, wherein portions of the cover surrounding the plurality of joining holes project to a predetermined height relative to portions of the cover not surrounding the plurality of joining holes.

* * * * *